United States Patent [19]
Ito

[11] Patent Number: 5,402,338
[45] Date of Patent: Mar. 28, 1995

[54] METHOD FOR FORMING ENERGY SUBTRACTION IMAGES

[75] Inventor: Wataru Ito, Kanagawa, Japan

[73] Assignee: Fuji Photo Film Co., Ltd., Kanagawa, Japan

[21] Appl. No.: 997,533

[22] Filed: Dec. 28, 1992

[30] Foreign Application Priority Data

| Dec. 26, 1991 | [JP] | Japan | 3-345274 |
| Dec. 27, 1991 | [JP] | Japan | 3-347044 |
| Mar. 3, 1992 | [JP] | Japan | 4-045529 |
| Mar. 3, 1992 | [JP] | Japan | 4-045530 |

[51] Int. Cl.$^6$ .................. G06F 15/68; G06F 15/62
[52] U.S. Cl. .................. 364/413.23; 364/413.13; 364/413.19; 250/583; 250/584; 250/587; 378/98.11; 378/98.9; 378/98.12
[58] Field of Search .............. 364/413.23, 413.13, 364/413.14, 413.17, 413.22, 413.26; 250/327.2, 327.1, 585, 583, 584, 587; 382/6; 378/98.9, 98.11, 98.12; 128/653.1, 653.2

[56] References Cited

U.S. PATENT DOCUMENTS

| 4,258,264 | 3/1981 | Kotera et al. | 250/585 |
| 4,276,473 | 6/1981 | Kato et al. | 250/327.1 |
| 4,315,318 | 2/1982 | Kato et al. | 382/6 |
| 4,356,398 | 10/1982 | Komaki et al. | 250/327.2 |
| 4,387,428 | 6/1983 | Ishida et al. | 364/413.13 |
| 4,538,179 | 8/1985 | Tsutomu et al. | 358/166 |
| 4,638,162 | 1/1987 | Tanaka et al. | 250/327.2 |
| 4,710,875 | 12/1987 | Nakajima et al. | 364/413.23 |
| 4,855,598 | 8/1989 | Ohgoda et al. | 250/327.2 |
| 4,861,993 | 8/1989 | Adachi et al. | 250/327.2 |
| 4,896,037 | 1/1990 | Shimura et al. | 250/327.2 |
| 5,049,746 | 9/1991 | Ito | 250/327.2 |
| 5,049,748 | 9/1991 | Ito et al. | 250/327.2 |
| 5,122,664 | 6/1992 | Ito et al. | 250/327.2 |
| 5,123,054 | 6/1992 | Hara et al. | 382/6 |
| 5,210,415 | 5/1993 | Ito | 250/327.2 |
| 5,291,403 | 3/1994 | Ito | 364/413.23 |
| 5,315,507 | 5/1994 | Nakajima et al. | 364/413.23 |

FOREIGN PATENT DOCUMENTS

| 56-11395 | 2/1981 | Japan . |
| 61-5193 | 2/1986 | Japan . |
| 61-280163 | 12/1986 | Japan . |
| 3-289277 | 12/1991 | Japan . |

OTHER PUBLICATIONS

"English language abstract of Japanese Patent Publication No. 61-5193".

Primary Examiner—Gail O. Hayes
Assistant Examiner—Joseph Thomas
Attorney, Agent, or Firm—Sughrue, Mion, Zinn, Macpeak & Seas

[57] ABSTRACT

Radiation images of an object constituted of tissues exhibiting different levels of radiation absorptivity are formed with two kinds of radiation having different energy levels. A first original image signal SO1 and a second original image signal SO2 representing the radiation images are detected. A superposition image signal is generated with a weighted addition expressed as $$S=(N2^2/(N1^2+N2^2))\times SO1+(N1^2/(N1^2+N2^2))\times SO2$$

wherein N1 and N2 respectively represent noise contained in the first and second original image signals. A first image signal representing a first image primarily composed of patterns of first tissues of the object is generated by subtracting the first and second original image signals from each other. A first smoothed image signal representing a first smoothed image, in which noise of the first image has been reduced or eliminated, is generated by smoothing the first image signal. A second image signal representing a second image primarily composed of patterns of second tissues of the object is generated by subtracting the superposition image signal and the first smoothed image signal from each other.

56 Claims, 11 Drawing Sheets

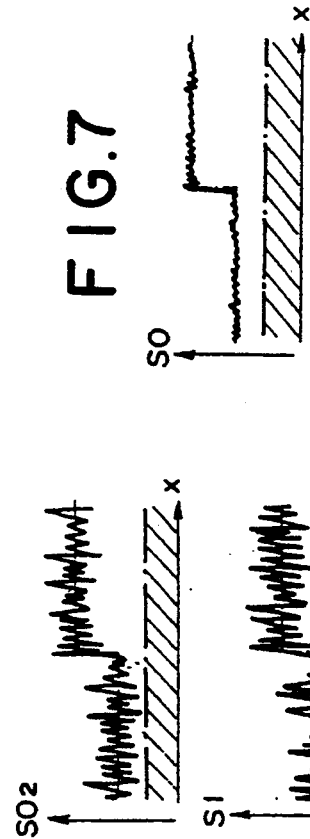
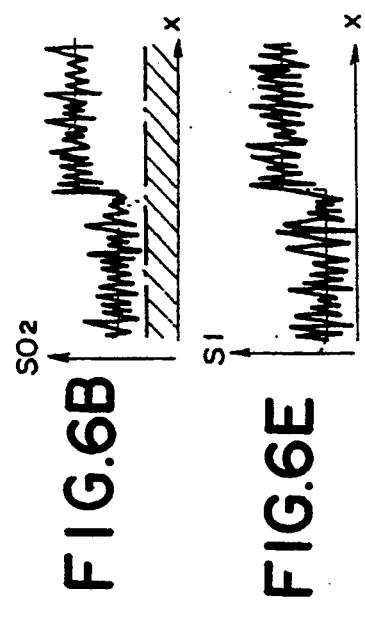
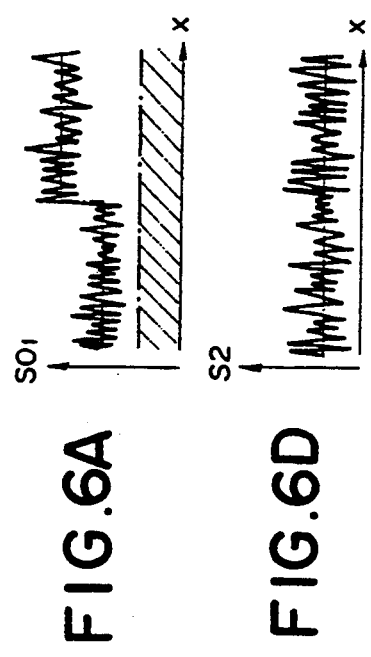
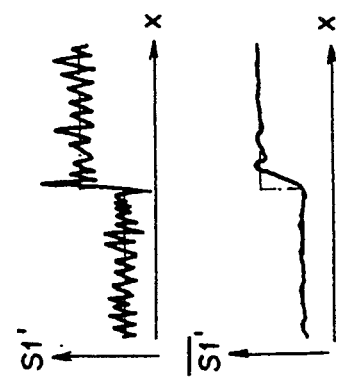
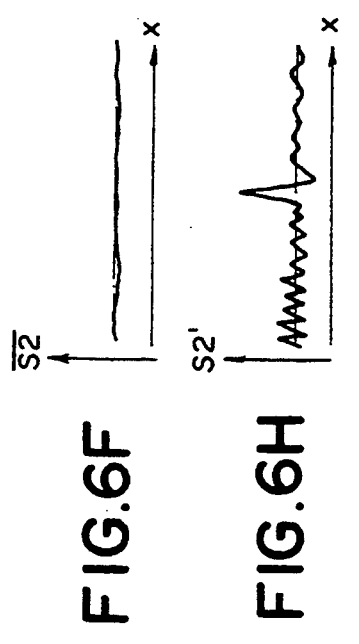
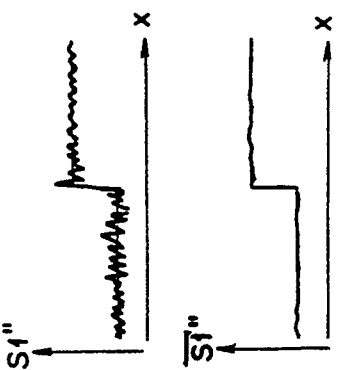
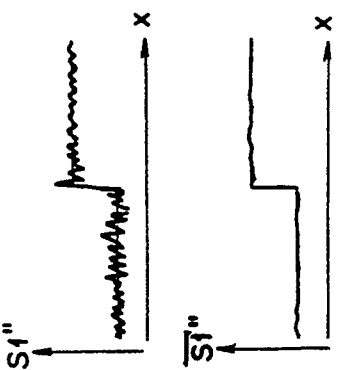
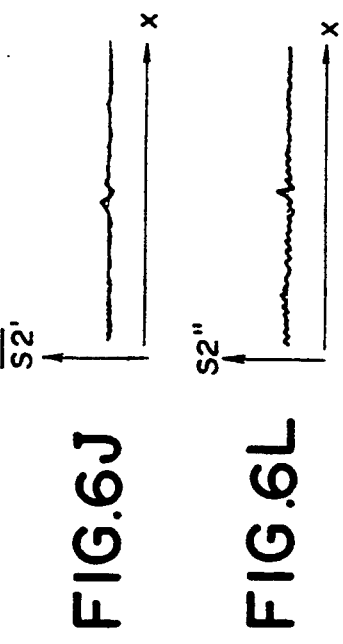
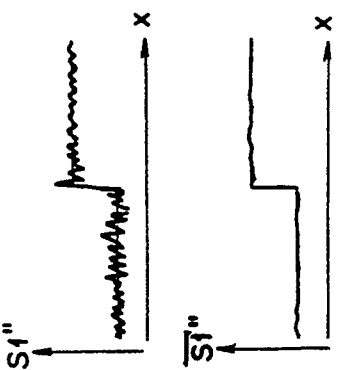
FIG.6A  FIG.6B  FIG.7
FIG.6D  FIG.6E
FIG.6F  FIG.6G
FIG.6H  FIG.6I
FIG.6J  FIG.6K
FIG.6L  FIG.6M

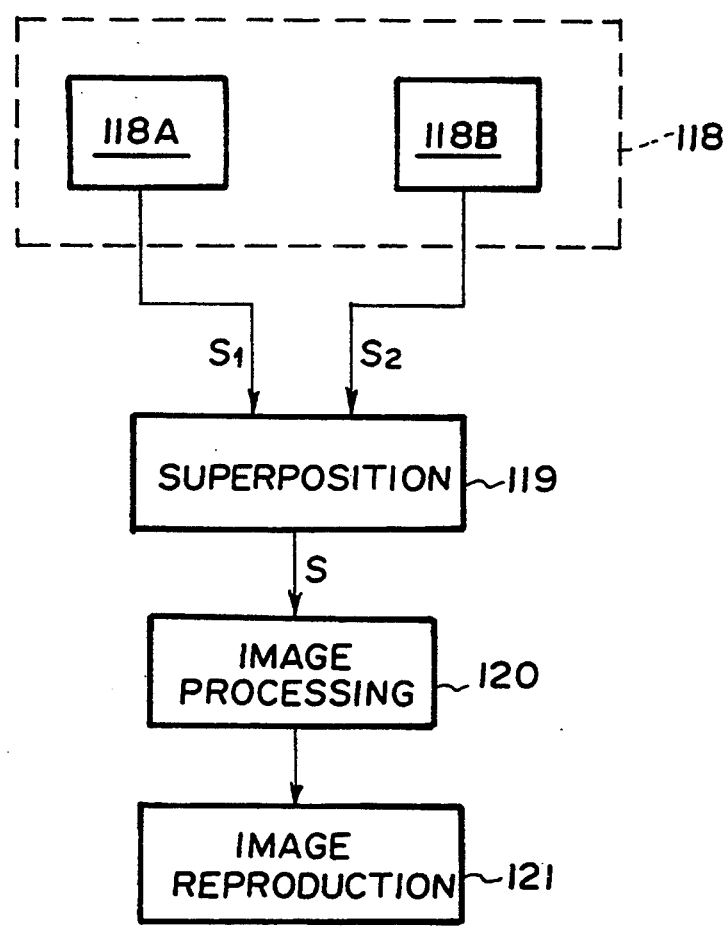

METHOD FOR FORMING ENERGY SUBTRACTION IMAGES

BACKGROUND OF THE INVENTION

1. Field of the Invention

This invention relates to a method for forming an energy subtraction image wherein, from a plurality of radiation images, an energy subtraction image is formed which includes little noise and which has good image quality and can serve as an effective tool in, particularly, the efficient and accurate diagnosis of an illness. This invention also relates to a superposition processing method and apparatus for radiation images, wherein an addition process is carried out on two image signals representing radiation images of a single object.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal, and the electric signal (image signal) is processed and then used for reproducing the X-ray image as a visible image on a photocopy, or the like. In this manner, a visible image having good image quality with high contrast, high sharpness, high graininess, or the like, can be reproduced.

Also, when certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays, such as visible light, light is emitted by the phosphor in proportion to the amount of energy stored thereon during its exposure to the radiation. A phosphor exhibiting such properties is referred to as a stimulable phosphor.

As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then scanned with stimulating rays, such as a laser beam, which cause it to emit light in proportion to the amount of energy stored during exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material such as photographic film, on a display device such as a cathode ray tube (CRT), or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order for the desired image density to be obtained, an appropriate read-out gain is set when the emitted light is being detected and converted into an electric signal (image signal) to be used in the reproduction of a visible image on a recording material, such as photographic film, or on a display device, such as a CRT.

In the radiation image recording and reproducing systems wherein recording media, such as X-ray film or stimulable phosphor sheets, are used, subtraction processing techniques for radiation images are often carried out on image signals detected from a plurality of radiation images of an object which have been recorded on the recording media.

With the subtraction processing techniques for radiation images, an image is obtained which corresponds to a difference between a plurality of radiation images of an object recorded under different conditions. Specifically, a plurality of the radiation images recorded under different conditions are read out at predetermined sampling intervals, and a plurality of image signals thus detected are converted into digital image signals which represent the radiation images. The image signal components of the digital image signals which represent the image information recorded at corresponding sampling points in the radiation images are then subtracted from each other. A difference signal is thereby obtained which represents the image of a specific structure or part of the object represented by the radiation images.

Basically, subtraction processing is carried out with either the so-called temporal (time difference) subtraction processing method or the so-called energy subtraction processing method. In the former method, in order for the image of a specific structure (for example, a blood vessel) of an object to be extracted from the image of the whole object, the image signal representing a radiation image obtained without injection of contrast media is subtracted from the image signal representing a radiation image in which the image of the specific structure (for example, a blood vessel) of the object is enhanced by the injection of contrast media. In the latter method, such characteristics are utilized that a specific structure of an object exhibits different levels of radiation absorptivity with respect to radiation with different energy levels. Specifically, an object is exposed to several kinds of radiation with different energy levels, and a plurality of radiation images are thereby obtained in which different images of a specific structure are embedded. Thereafter, the image signals representing the plurality of the radiation images are weighted appropriately and subjected to a subtraction process in order to extract the image of the specific structure. The applicant proposed novel energy subtraction processing methods using stimulable phosphor sheets in, for example, U.S. Pat. Nos. 4,855,598 and 4,896,037.

A plurality of radiation images, which are subjected to energy subtraction processing, will herein be referred to as the "original images". An image signal representing a subtraction image is obtained by subtracting the image signals representing the original images from each other. Therefore, the image signal representing the subtraction image has a lower signal-to-noise ratio (S/N ratio) than the image signals representing the original images. As a result, the problems occur in that the image quality of the subtraction image becomes worse than the image quality of the original images.

By way of example, energy subtraction processing is often carried out in the manner described below. Specifically, an object, such as the chest of a human body, which is constituted of soft tissues and bones, is exposed to several kinds of radiation with different energy levels, and a plurality of radiation images of the object are thereby obtained. The plurality of the radiation images are read out, and a plurality of image signals representing the radiation images are generated. Energy subtraction processing is then carried out on the plurality of the image signals. From the energy subtraction processing, a soft tissue image signal is obtained which represents a soft tissue image primarily composed of patterns of the soft tissues of the object. Alternatively, a bone image signal is obtained which represents a bone image primarily composed of patterns of the bones of the object. Thereafter, the soft tissue image is reproduced as a visible image from the soft tissue image signal, or the bone image is reproduced as a visible image from the bone image signal. In the soft tissue image, the patterns of the bones have been erased. Therefore, patterns, which were behind the bone patterns or were rendered imperceptible by the bone patterns in the original images, become more perceptible in the soft tissue image than in the original images. Also, in the bone image, the patterns of the soft tissues have been erased. Therefore, patterns, which were behind the soft tissue patterns or were rendered imperceptible by the soft tissue patterns in the original images, become more perceptible in the bone image than in the original images. Accordingly, a subtraction image can be obtained which is well matched to the purposes of diagnosis. However, because the soft tissue image and the bone image are obtained from the subtraction processing, the problems occur in that noise components have been emphasized in the soft tissue image and the bone image than in the original images. From this point of view, the image quality of the soft tissue image and the bone image could not heretofore been kept good.

Accordingly, in pending U.S. patent application Ser. No. 654,450, the applicant proposed a method for forming an energy subtraction image wherein a subtraction image is formed in which noise has been reduced. The proposed method comprises the steps of:

i) after a plurality of radiation images of an object are recorded on recording media by irradiating several kinds of radiation with different energy levels to the object, which is constituted of a plurality of tissues exhibiting different levels of radiation absorptivity with respect to the several kinds of radiation with different energy levels, and a plurality of original image signals representing the plurality of the radiation images are then detected, generating a first image signal, which represents a first image primarily composed of patterns of first tissues of the object, from the plurality of the original image signals, ii) generating a first smoothed image signal by processing the first image signal, the first smoothed image signal representing a first smoothed image in which noise components of the first image have been reduced or eliminated, and iii) generating a second image signal by subtracting the first smoothed image signal from an original image signal, the second image signal representing a second image primarily composed of patterns of second tissues of the object.

In pending U.S. patent application Ser. No. 654,450, the applicant also proposed a method for forming an energy subtraction image wherein, after the aforesaid first process is carried out in order to generate the first image signal, the second process is carried out in order to generate the second image signal. Thereafter, a third process is carried out, which comprises the steps of:

a) generating a second smoothed image signal by processing the second image signal, the second smoothed image signal representing a second smoothed image in which noise components of the second image have been reduced, and b) generating a new first image signal by subtracting the second smoothed image signal from an original image signal, the new first image signal representing a new first image primarily composed of the patterns of the first tissues of the object.

The proposed method for forming an energy subtraction image may be modified such that the second process or the third process is repeated, and noise components of the image signal may be reduced even further.

With the methods for forming an energy subtraction image, which are proposed in pending U.S. patent application Ser. No. 654,450, the image signal components of the first image signal and the second image signal are added to each other which represent the image information stored at corresponding picture elements in the two radiation images. In this manner, a superposition image signal SO is obtained, which can be expressed as $$SO = (SO1 + SO2)/2$$

wherein SO1 represents the first image signal, and SO2 represents the second image signal. In the superposition image signal SO, noise components of the image signal have been reduced. Therefore, the addition process is advantageous for the subsequent processes.

However, the superposition image signal is obtained with the formula shown above wherein the values of the first image signal and the second image signal are merely averaged. Therefore, the degree of reduction in the noise components is not necessarily be appropriate. Thus a need exists for a method for forming an energy subtraction image, which yields an energy subtraction image in which the noise components have been reduced even further.

SUMMARY OF THE INVENTION

The primary object of the present invention is to provide a method for forming an energy subtraction image, wherein an energy subtraction image is formed in which noise has been reduced to a higher extent and which has better image quality and can serve as a more effective tool in, particularly, the efficient and accurate diagnosis of an illness than an energy subtraction image obtained with a conventional method for forming an energy subtraction image.

Another object of the present invention is to provide a superposition processing method for radiation images, wherein weight factors appropriate for two sets of image signals are employed during superposition processing carried out on the two sets of the image signals, and a superposition image having good image quality is thereby obtained from the superposition processing.

The specific object of the present invention is to provide an apparatus for carrying out the superposition processing method for radiation images.

The present invention provides a first method for forming an energy subtraction image comprising the steps of:

i) after two kinds of radiation images of an object are formed with two kinds of radiation having different energy levels, the object being constituted of a plurality of tissues exhibiting different levels of radiation absorptivity with respect to the two kinds of radiation having different energy levels, detecting first and second original image signals representing the two kinds of the radiation images, ii) generating a superposition image signal by carrying out a weighted addition expressed as $$S=(N2^2/(N1^2+N2^2))\times SO1+(N1^2/(N1^2+N2^2))\times SO2$$

wherein SO1 represents the first original image signal, N1 represents noise contained in the first original image signal, SO2 represents the second original image signal, and N2 represents noise contained in the second Original image signal, iii) generating a first image signal, which represents a first image primarily composed of patterns of first tissues of the object, by subtracting the first original image signal and the second original image signal from each other, iv) generating a first smoothed image signal by smoothing the first image signal, the first smoothed image signal representing a first smoothed image in which noise components of the first image have been reduced or eliminated, and v) generating a second image signal by subtracting the superposition image signal and the first smoothed image signal from each other, the second image signal representing a second image primarily composed of patterns of second tissues of the object.

In the above-described first method and also in the below-described various other methods according to the present invention including those defined in claims, the expression of "with two kinds of radiation having different energy levels" does not necessarily means two separate radiations but include two kinds of radiations originated from a single radiation wherein, for example, one is a direct radiation from an X-ray source and the other is a radiation from the same source passing through a phosphor sheet and/or a filter or the like the low energy components of which are filtered out. Therefore, the two kinds of radiation images can be formed one after another using different radiations of different energy levels or formed simultaneously using a single radiation with two recording media or stimulable phosphor sheets placed one upon another with or without a filter interposed therebetween. When the filter is not used, the stimulable phosphor placed one another functions as a filter to filter out the low energy components.

The first method for forming an energy subtraction image in accordance with the present invention may be embodied in various, substantially identical manners. For example, each of the steps of the first method for forming an energy subtraction image in accordance with the present invention may be divided even further into a plurality of steps. Alternatively, the operations may be carried out in different orders.

By way of example, in cases where the object is a human body, the term "a plurality of tissues exhibiting different levels of radiation absorptivity" as used herein means various tissues of the human body, such as bones and soft tissues, or mammary cancer tissues and mammary gland tissues. In cases where the object is an inorganic body, such as a machine subjected to non-destructive inspections, the term "a plurality of tissues exhibiting different levels of radiation absorptivity" as used herein means portions of the inorganic body, which are constituted of different materials, and the like.

The present invention also provides a second method for forming an energy subtraction image comprising the steps of:

i) after two kinds of radiation images of an object are formed with two kinds of radiation having different energy levels, the object being constituted of a plurality of tissues exhibiting different levels of radiation absorptivity with respect to the two kinds of radiation having different energy levels, detecting first and second original image signals representing the two kinds of the radiation images, ii) generating a superposition image signal by carrying out a weighted addition expressed as $$S=(N2^2/(N1^2+N2^2))\times SO1+(N1^2/(N1^2+N2^2))\times SO2$$

wherein SO1 represents the first original image signal, N1 represents noise contained in the first original image signal, SO2 represents the second original image signal, and N2 represents noise contained in the second original image signal, iii) carrying out a first process for generating a first image signal, which represents a first image primarily composed of patterns of first tissues of the object, by subtracting the first original image signal and the second original image signal from each other, iv) thereafter carrying out a second process, which comprises the steps of:

a) generating a first smoothed image signal by smoothing the first image signal, the first smoothed image signal representing a first smoothed image in which noise components of the first image have been reduced, and b) generating a second image signal by subtracting the superposition image signal and the first smoothed image signal from each other, the second image signal representing a second image primarily composed of patterns of second tissues of the object, and v) thereafter carrying out a third process, which comprises the steps of:

a) generating a second smoothed image signal by smoothing the second image signal, the second smoothed image signal representing a second smoothed image in which noise components of the second image have been reduced, and b) generating a new first image signal by subtracting the superposition image signal and the second smoothed image signal from each other, the new first image signal representing a new first image primarily composed of the patterns of the first tissues of the object.

An image having better image quality can be obtained by repeating the second and third processes in the second method for forming an energy subtraction image in accordance with the present invention. Specifically, the present invention further provides a third method for forming an energy subtraction image comprising the steps of:

i) carrying out the processes in the second method for forming an energy subtraction image in accordance with the present invention, and ii) thereafter repeating the following once or several times:

a) a new second process for generating a new second image signal by carrying out the second process in which the new first image signal obtained from the third process is taken as the first image signal in the second process, the new second image signal generated by the new second process representing a new second image primarily composed of the patterns of the second tissues of the object, and b) a new third process for generating a new first image signal by carrying out the third process in which the new second image signal is taken as the second image signal in the third process, the new first image signal generated by the new third process representing a new first image primarily composed of the patterns of the first tissues of the object.

By applying the second or third method for forming an energy subtraction image in accordance with the present invention, a new second image signal can be generated ultimately which represents a new second image primarily composed of the patterns of the second tissues of the object. Specifically, the present invention still further provides a fourth method for forming an energy subtraction image comprising the steps of:

i) carrying out the processes in the second or third method for forming an energy subtraction image in accordance with the present invention, and ii) generating a new second image signal by carrying out the second process or the new second process in which the new first image signal obtained from the third process or the new third process is taken as the first image signal in the second process or the new second process, the new second image signal thus most recently generated representing a new second image primarily composed of the patterns of the second tissues of the object.

Each of the second to fourth methods for forming an energy subtraction image in accordance with the present invention includes steps similar to those of the first method for forming an energy subtraction image in accordance with the present invention. Therefore, as described above with reference to the first method for forming an energy subtraction image in accordance with the present invention, the second to fourth methods for forming an energy subtraction image in accordance with the present invention embraces various, substantially identical embodiments. Also, other steps, such as noise reducing processes, may be carried out before or after the first to fourth methods for forming an energy subtraction image in accordance with the present invention are carried out.

The present invention also provides a fifth method for forming an energy subtraction image, wherein each of the first to fourth methods for forming an energy subtraction image in accordance with the present invention is modified such that the superposition image signal is generated by carrying out a weighted addition expressed as $$S = (Sk2/(Sk1+Sk2)) \times SO1 + (Sk1/(Sk1+Sk2)) \times SO2$$

wherein SO1 represents the first original image signal, Sk1 represents a sensitivity of the first original image signal, SO2 represents the second original image signal, and Sk2 represents a sensitivity of the second original image signal.

By way of example, in cases where an original image signal is detected from a stimulable phosphor sheet, the term "sensitivity of an original image signal" as used herein means the sensitivity of the original image signal. In cases where an original image signal is detected from X-ray film, on which an X-ray image has been recorded, the term "sensitivity of an original image signal" as used herein means the sensitivity of the X-ray film.

In the methods for forming an energy subtraction image in accordance with the present invention, the superposition image signal is generated from the weighted addition expressed as $$S = (N2^2/(N1^2+N2^2)) \times SO1 + (N1^2/(N1^2+N2^2)) \times SO2 \quad (1)$$

The weight factors $N2^2/(N1^2+N2^2)$ and $N1^2/(N1^2+N2^2)$ in Formula (1) are determined in the manner described below.

Specifically, if a superposition image signal S is generated from a weighted addition expressed as $$S = a \times SO1 + (1-a) \times SO2 \quad (2)$$

wherein a represents an arbitrary fixed number, noise N of the superposition image signal S will be expressed as $$N = \sqrt{(a \times N_1)^2 + ((1-a) \times N_2)^2} \quad (3)$$

wherein N1 represents noise contained in the first image signal SO1, and N2 represents noise contained in the second image signal SO2.

Therefore, when the fixed number a is set such that noise N may become minimum, and the fixed number a thus set is substituted into Formula (2), a superposition image signal S can be obtained which yields a radiation image having good image quality.

In order for noise N to be minimized, the value of $N^2$ may be minimized. Formula (3) can be transformed into $$N^2 = (a \times N1)^2 + ((1-a) \times N2)^2 \quad (4)$$

Partial differentiation of Formula (4) with respect to the fixed number a yields $$\frac{\partial N^2}{\partial a} = 2aN1^2 - 2(1-a)N2^2 \quad (5)$$

Noise $N^2$ becomes minimum at a point, at which the value obtained from partial differentiation of the second power of noise N with respect to the fixed number a becomes equal to zero. Therefore, from Formula (5), a value of the fixed number a is calculated which satisfies the condition $$2a \times N1^2 - 2(1-a) \times N2^2 = 0 \qquad (6)$$

The following formulas obtain:

$$a = N2^2/(N1^2 + N2^2), \quad (1-a) = N1^2/(N1^2 + N2^2) \qquad (7)$$

Substitution of the value of the fixed number a into Formula (2) yields Formula (1). Therefore, when the superposition image signal S is generated by carrying out the weighted addition expressed as Formula (1), noise of the superposition image signal S becomes minimum.

In the fifth method for forming an energy subtraction image in accordance with the present invention, the superposition image signal S is generated by carrying out the weighted addition expressed as $$S = (Sk2/(Sk1+Sk2)) \times SO1 + (Sk1/(Sk1+Sk2)) \times SO2 \qquad (8)$$

In Formula (8), the sensitivity Sk1 and the sensitivity Sk2, which are parameters used when image processing, or the like, is carried out on image signals, are employed for the reasons described below.

Specifically, in a region in which the level of the image signal is most predominant, the second power of noise has an approximately linear relationship to the amount of radiation, to which the stimulable phosphor sheet is exposed. Also, the sensitivity has a strong correlation to the amount of radiation, to which the stimulable phosphor sheet is exposed. Therefore, the values of $N1^2$ and $N2^2$ employed in the first method for forming an energy subtraction image in accordance with the present invention are replaced by the sensitivity Sk1 and the sensitivity Sk2, and noise contained in the superposition image signal S is thereby minimized.

As indicated by line 70 illustrated in FIG. 11, the sensitivity, which has a linear relationship to the second power of noise, is expressed in terms of the logarithmic value of the sensitivity, which is determined from the image signal. Therefore, the sensitivity Sk1 and the sensitivity Sk2 in Formula (8) are expressed in terms of the logarithmic values. Accordingly, in cases where the weighted addition is carried out by using the values of the sensitivity before being converted into the logarithmic values, Formula (8) is transformed into the formula $$S = (\log Sk2'/(\log Sk1' + \log Sk2')) \times SO1 + (\log Sk1'/(\log Sk1' + \log Sk2')) \times SO2 \qquad (8')$$

wherein each of Sk1' and Sk2' represents the sensitivity before being converted into the logarithmic value.

The terms "first image" and "second image" (or the terms "new first image" and "new second image") as used herein for the aforesaid methods for forming an energy subtraction image in accordance with the present invention mean two images, which have been obtained from energy subtraction processing and in which the patterns of different tissues of a single object have been emphasized or only such patterns are illustrated. The first image and the second image (or the new first image and the new second image) are not limited to specific images. For example, the first image and the second image (or the new first image and the new second image) may be a soft tissue image and a bone image. Alternatively, in cases where the object is a mamma of a human body, the first image and the second image (or the new first image and the new second image) may be an image, in which the patterns of mammary glands have been emphasized, and an image, in which the pattern of a malignant tumor has been emphasized.

The present invention further provides a sixth method for forming an energy subtraction image, wherein each of the first to fourth methods for forming an energy subtraction image in accordance with the present invention is modified such that the superposition image signal is generated by calculating a sensitivity Sk1 of each of image signal components of the first original image signal, which represent picture elements in the corresponding radiation image, and a sensitivity Sk2 of each of image signal components of the second original image signal, which represent picture elements in the corresponding radiation image, on the basis of the first original image signal SO1 and the second original image signal SO2, and carrying out a weighted addition on the image signal components of the first original image signal and the second original image signal, which represent corresponding picture elements in the two kinds of the radiation images, the weighted addition being expressed as $$S = (Sk2/(Sk1+Sk2)) \times SO1 + (Sk1/(Sk1+Sk2)) \times SO2$$

The present invention still further provides a seventh method for forming an energy subtraction image, wherein each of the first to fourth methods for forming an energy subtraction image in accordance with the present invention is modified such that the superposition image signal is generated by generating an unsharp signal of the first original image signal SO1 and an unsharp signal of the second original image signal SO2, calculating a sensitivity Sk1 of each of image signal components of the first original image signal, which represent picture elements in the corresponding radiation image, and a sensitivity Sk2 of each of image signal components of the second original image signal, which represent picture elements in the corresponding radiation image, on the basis of the unsharp signal of the first original image signal SO1 and the unsharp signal of the second original image signal SO2, and carrying out a weighted addition on the image signal components of the first original image signal and the second original image signal, which represent corresponding picture elements in the two kinds of the radiation images, the weighted addition being expressed as $$S = (Sk2/(Sk1+Sk2)) \times SO1 + (Sk1/(Sk1+Sk2)) \times SO2$$

With the first method for forming an energy subtraction image in accordance with the present invention, two kinds of radiation images of the object are formed with two kinds of radiation having different energy levels. The object is constituted of a plurality of tissues exhibiting different levels of radiation absorptivity with respect to the two kinds of radiation having different energy levels. The first and second original image signals representing the two kinds of the radiation images are then detected. Also, the superposition image signal is generated by carrying out the weighted addition expressed as $$S=(N2^2/(N1^2+N2^2))\times SO1+(N1^2/(N1^2+N2^2))\times SO2$$

wherein SO1 represents the first original image signal, N1 represents noise contained in the first original image signal, SO2 represents the second original image signal, and N2 represents noise contained in the second original image signal. Thereafter, the first image signal, which represents the first image primarily composed of patterns of first tissues of the object, is generated by carrying out the subtraction process on the first and second original image signals. The first smoothed image signal is then generated by smoothing the first image signal. The first smoothed image signal represents a first smoothed image in which noise components of the first image have been reduced or eliminated. Thereafter, the first smoothed image signal is subtracted from the superposition image signal, and the second image signal is thereby generated which represents the second image primarily composed of patterns of second tissues of the object. Therefore, an image signal can be obtained in which noise components have been reduced even further than a superposition image signal obtained with the operation for generating a superposition image signal in the method for forming an energy subtraction image proposed in pending U.S. patent application Ser. No. 654,450. In this manner, a second image can be obtained in which noise has been reduced to approximately the same level as that in the original images and which has good image quality and can serve as an effective tool in, particularly, the efficient and accurate diagnosis of an illness.

In order for the second image having good image quality to be obtained, it is necessary that, in the course of generating the first smoothed image signal representing the first smoothed image, the signal components of the first image signal representing the patterns of the first tissues of the object can be kept uneliminated, and only the noise components of the first image signal can be eliminated. However, part of the spatial frequency components corresponding to the patterns of the first tissues and part of the spatial frequency components corresponding to the noise components are identical with each other. Therefore, even if a non-linear filter is utilized which eliminates as many noise components as possible, the noise components and the signal components of the first image signal representing the patterns of the first tissues of the object cannot be completely separated from each other.

Accordingly, with the second to fourth methods for forming an energy subtraction image in accordance with the present invention, instead of aiming at completely eliminating the noise components only with a single noise reducing process, a plurality of noise reducing processes are carried out sequentially such that an image can be obtained in which noise has been reduced and which has good image quality and can serve as an effective tool in, particularly, the efficient and accurate diagnosis of an illness.

Specifically, with the second method for forming an energy subtraction image in accordance with the present invention, a noise reducing process is carried out on the first image signal in order to generate the first smoothed image signal representing a first smoothed image in which noise components of the first image have been reduced. The second image signal is then generated by subtracting the first smoothed image signal and the superposition image signal from each other. Thereafter, a noise reducing process is carried out on the second image signal in order to generate the second smoothed image signal representing a second smoothed image in which noise components of the second image have been reduced. The new first image signal is then generated by subtracting the second smoothed image signal and the superposition image signal from each other. With the two noise reducing processes, noise components can be reduced in appropriate manners. Therefore, an image can be obtained which contains less noise and which has better image quality and can serve as a more effective tool in, particularly, the efficient and accurate diagnosis of an illness, than the first method for forming an energy subtraction image in accordance with the present invention.

With the third method for forming an energy subtraction image in accordance with the present invention, the steps of the second method for forming an energy subtraction image in accordance with the present invention are carried out repeatedly such that more noise components can be reduced. The respective noise reducing processes can be allotted with appropriate modes of processing. Therefore, an image can be obtained in which noise components have been reduced even further.

With the fourth method for forming an energy subtraction image in accordance with the present invention, after the steps of the second or third method for forming an energy subtraction image in accordance with the present invention have been carried out, a noise reducing process is carried out on the new first image signal, which has been generated by the second or third method for forming an energy subtraction image. In this manner, a new first smoothed image signal is generated. Thereafter, the new first smoothed image signal and the superposition image signal are subtracted from each other. Accordingly, the new second image can be obtained in which noise components have been reduced.

With the fifth method for forming an energy subtraction image in accordance with the present invention, the sensitivity of the first original image signal and the sensitivity of the second original image signal are detected. The first and second original image signals are weighted in accordance with the sensitivity values and added to each other, and the superposition image signal is thereby generated. With the fifth method for forming an energy subtraction image in accordance with the present invention, as in the first to fourth methods for forming an energy subtraction image in accordance with the present invention, an image can be obtained in which the noise components have been reduced.

With the sixth method for forming an energy subtraction image in accordance with the present invention, the values of the sensitivities, from which the weight factors are determined such that noise contained in the superposition image signal may be minimized, are calculated for the respective image signal components of the first and second original image signals, which represent picture elements in the corresponding radiation images. Therefore, noise can be minimized for each of the picture elements in the resulting image such that the image quality of the image may not be adversely affected by variations in the amount of radiation, which impinged upon a recording medium after being irradiated to the object, for different positions on the recording medium.

Accordingly, the image can be obtained which has good image quality.

With the seventh method for forming an energy subtraction image in accordance with the present invention, unsharp signals of the first and second original image signals are generated. The values of the sensitivities of the respective image signal components of the first and second original image signals, which represent picture elements in the corresponding radiation images, are calculated on the basis of the unsharp signals of the first and second original image signals. Therefore, the values of the sensitivities of the respective image signal components of the first and second original image signals, which represent picture elements in the corresponding radiation images, can be obtained such that the sensitivities may not be adversely affected by minute changes and noise in the image signals. Also, appropriate weight factors can be determined from the calculated values of the sensitivities.

The present invention also provides a first superposition processing method for radiation images, wherein first and second image signals, each of which is made up of a series of image signal components and which represent radiation images of a single object, are obtained, and an addition signal is obtained by adding the image signal components of the first and second image signals to each other which represent corresponding picture elements in the radiation images, the superposition processing method for radiation images comprising generating the addition signal by carrying out a weighted addition expressed as $S=(N2^2/(N1^2+N2^2))\times S1+(N1^2/(N1^2+N2^2))\times S2$ wherein S1 represents the first image signal, N1 represents noise contained in the first image signal, S2 represents the second image signal, N2 represents noise contained in the second image signal, and S represents the addition signal.

The present invention further provides an apparatus for carrying out the first superposition processing method for radiation images in accordance with the present invention.

Specifically, the present invention further provides a first superposition processing apparatus for radiation images comprising a means for obtaining first and second image signals, each of which is made up of a series of image signal components and which represent radiation images of a single object, and an addition means for obtaining an addition signal by adding the image signal components of the first and second image signals to each other which represent corresponding picture elements in the radiation images, wherein the addition means carries out a weighted addition expressed as $S=(N2^2/(N1^2+N2^2))\times S1+(N1^2/(N1^2+N2^2))\times S2$ wherein S1 represents the first image signal, N1 represents noise contained in the first image signal, S2 represents the second image signal, N2 represents noise contained in the second image signal, and S represents the addition signal.

The present invention still further provides a second superposition processing method for radiation images, wherein first and second image signals, each of which is made up of a series of image signal components and which represent radiation images of a single object, are obtained, and an addition signal is obtained by adding the image signal components of the first and second image signals to each other which represent corresponding picture elements in the radiation images, the superposition processing method for radiation images comprising generating the addition signal by carrying out a weighted addition expressed as $S=(Sk2/(Sk1+Sk2))\times S1+(Sk1/(Sk1+Sk2))\times S2$ wherein S1 represents the first image signal, Sk1 represents a sensitivity of the first image signal, S2 represents the second image signal, Sk2 represents a sensitivity of the second image signal, and S represents the addition signal.

By way of example, in cases where an image signal is detected from a stimulable phosphor sheet, the term "sensitivity of an image signal" as used herein for the superposition processing methods and apparatuses for radiation images in accordance with the present invention means the sensitivity of the image signal. In cases where an image signal is detected from X-ray film, on which an X-ray image has been recorded, the term "sensitivity of an image signal" as used herein means the sensitivity of the X-ray film.

The present invention also provides an apparatus for carrying out the second superposition processing method for radiation images in accordance with the present invention.

Specifically, the present invention also provides a second superposition processing apparatus for radiation images comprising a means for obtaining first and second image signals, each of which is made up of a series of image signal components and which represent radiation images of a single object, and an addition means for obtaining an addition signal by adding the image signal components of the first and second image signals to each other which represent corresponding picture elements in the radiation images, wherein the addition means carries out a weighted addition expressed as $S=(Sk2/(Sk1+Sk2))\times S1+(Sk1/(Sk1+Sk2))\times S2$ wherein S1 represents the first image signal, Sk1 represents a sensitivity of the first image signal, S2 represents the second image signal, Sk2 represents a sensitivity of the second image signal, and S represents the addition signal.

In the first superposition processing method and apparatus for radiation images in accordance with the present invention, the addition signal S is generated from the weighted addition expressed as $$S=(N2^2/(N1^2+N2^2))\times S1+(N1^2/(N1^2+N2^2))\times S2 \quad (9)$$

The weight factors $N2^2/(N1^2+N2^2)$ and $N1^2/(N1^2+N2^2)$ in Formula (9) are determined in the manner described above with reference to Formulas (2) through (7). In this case, SO1 and SO2 in Formula (2) and in the corresponding descriptions should be replaced respectively by S1 and S2, and the term "superposition image signal S" in the descriptions corresponding to Formulas (2) through (7) should be replaced by the term "addition signal S." Substitution of the value of the fixed number a, which has been obtained from Formulas (7), into Formula (2), in which SO1 and SO2 have been replaced respectively by S1 and S2, yields Formula (9). Therefore, when the addition signal S is generated by carrying out the weighted addition expressed as Formula (9), noise of the addition signal S becomes minimum.

In the second superposition processing method and apparatus for radiation images in accordance with the present invention, the addition signal S is generated by carrying out the weighted addition expressed as $$S = (Sk2/(Sk1+Sk2)) \times S1 + (Sk1/(Sk1+Sk2)) \times S2 \quad (10)$$

In Formula (10), the sensitivity Sk1 and the sensitivity Sk2, which are parameters used when image processing, or the like, is carried out on image signals, are employed for the reasons described below.

Specifically, in a region in which the level of the image signal is most predominant, the second power of noise has an approximately linear relationship to the amount of radiation, to which the recording medium for recording the image thereon is exposed. Also, the sensitivity has a strong correlation to the amount of radiation, to which the recording medium is exposed. Therefore, the values of $N1^2$ and $N2$ employed in the first superposition processing method and apparatus for radiation images in accordance with the present invention are replaced by the sensitivity Sk1 and the sensitivity Sk2, and noise contained in the addition signal S is thereby minimized.

As indicated by line 70 illustrated in FIG. 11, the sensitivity, which has a linear relationship to the second power of noise, is expressed in terms of the logarithmic value of the sensitivity, which is determined from the image signal. Therefore, the sensitivity Sk1 and the sensitivity Sk2 in Formula (10) are expressed in terms of the logarithmic values. Accordingly, in cases where the weighted addition is carried out by using the values of the sensitivity before being converted into the logarithmic values, Formula (10) is transformed into the formula $$S = (\log Sk2'/(\log Sk1' + \log Sk2')) \times S1 + (\log Sk1'/(\log Sk1' + \log Sk2')) \times S2 \quad (10')$$

wherein each of $Sk1'$ and $Sk2'$ represents the sensitivity before being converted into the logarithmic value.

The present invention further provides a third superposition processing method for radiation images, wherein first and second image signals, each of which is made up of a series of image signal components and which represent radiation images of a single object, are obtained, and an addition signal S is obtained by adding the image signal components of the first and second image signals to each other which represent corresponding picture elements in the radiation images, the superposition processing method for radiation images comprising generating the addition signal S by the steps of:

i) calculating a sensitivity Sk1 of each of image signal components of the first image signal, which represent picture elements in the corresponding radiation image, and a sensitivity Sk2 of each of image signal components of the second image signal, which represent picture elements in the corresponding radiation image, on the basis of the first image signal S1 and the second image signal S2, and ii) carrying out a weighted addition on the image signal components of the first image signal and the second image signal, which represent corresponding picture elements in the two kinds of the radiation images, the weighted addition being expressed as $$S = (Sk2/(Sk1+Sk2)) \times S1 + (Sk1/(Sk1+Sk2)) \times S2$$

The present invention still further provides a third superposition processing apparatus for radiation images comprising a means for obtaining first and second image signals, each of which is made up of a series of image signal components and which represent radiation images of a single object, and an addition means for obtaining an addition signal S by adding the image signal components of the first and second image signals to each other which represent corresponding picture elements in the radiation images, wherein the addition means comprises:

i) an operation device for calculating a sensitivity Sk1 of each of image signal components of the first image signal, which represent picture elements in the corresponding radiation image, and a sensitivity Sk2 of each of image signal components of the second image signal, which represent picture elements in the corresponding radiation image, on the basis of the first image signal S1 and the second image signal S2, and ii) an addition device for carrying out a weighted addition on the image signal components of the first image signal and the second image signal, which represent corresponding picture elements in the two kinds of the radiation images, the weighted addition being expressed as $$S = (Sk2/(Sk1+Sk2)) \times S1 + (Sk1/(Sk1+Sk2)) \times S2$$

The present invention also provides a fourth superposition processing method for radiation images, wherein first and second image signals, each of which is made up of a series of image signal components and which represent radiation images of a single object, are obtained, and an addition signal S is obtained by adding the image signal components of the first and second image signals to each other which represent corresponding picture elements in the radiation images, the superposition processing method for radiation images comprising generating the addition signal S by the steps of:

i) generating an unsharp signal of the first image signal S1 and an unsharp signal of the second image signal S2, ii) calculating a sensitivity Sk1 of each of image signal components of the first image signal, which represent picture elements in the corresponding radiation image, and a sensitivity Sk2 of each of image signal components of the second image signal, which represent picture elements in the corresponding radiation image, on the basis of the unsharp signal of the first image signal S1 and the unsharp signal of the second image signal S2, and iii) carrying out a weighted addition on the image signal components of the first image signal and the second image signal, which represent corresponding picture elements in the two kinds of the radiation images, the weighted addition being expressed as $$S=(Sk2/(Sk1+Sk2))\times S1+(Sk1/(Sk1+Sk2))\times S2$$

The present invention further provides a fourth superposition processing apparatus for radiation images comprising a means for obtaining first and second image signals, each of which is made up of a series of image signal components and which represent radiation images of a single object, and an addition means for obtaining an addition signal S by adding the image signal components of the first and second image signals to each other which represent corresponding picture elements in the radiation images, wherein the addition means comprises:

i) an operation device for generating an unsharp signal of the first image signal S1 and an unsharp signal of the second image signal S2, and calculating a sensitivity Sk1 of each of image signal components of the first image signal, which represent picture elements in the corresponding radiation image, and a sensitivity Sk2 of each of image signal components of the second image signal, which represent picture elements in the corresponding radiation image, on the basis of the unsharp signal of the first image signal S1 and the unsharp signal of the second image signal S2, and ii) an addition device for carrying out a weighted addition on the image signal components of the first image signal and the second image signal, which represent corresponding picture elements in the two kinds of the radiation images, the weighted addition being expressed as $$S=(Sk2/(Sk1+Sk2))\times S1+(Sk1/(Sk1+Sk2))\times S2$$

With the superposition processing methods and apparatuses for radiation images in accordance with the present invention, the weight factors are determined such that noise contained in the addition signal S may be minimized. The weight factors are utilized when the image signals for yielding the addition signal are weighted. Therefore, noise contained in the image reproduced from the addition signal can be minimized, and an image having good graininess and good image quality can be obtained.

Also, with the superposition processing methods and apparatuses for radiation images in accordance with the present invention, the values of the sensitivities, from which the weight factors are determined such that noise contained in the addition signal S may be minimized, are calculated for the respective image signal components of the first and second image signals, which represent picture elements in the corresponding radiation images. Therefore, noise can be minimized for each of the picture elements in the resulting image such that the image quality of the image may not be adversely affected by variations in the amount of radiation, which impinged upon a recording medium after being irradiated to the object, for different positions on the recording medium. Accordingly, the image can be obtained which has good image quality.

With the fourth superposition processing method and apparatus for radiation images in accordance with the present invention, unsharp signals of the first and second image signals are generated. The values of the sensitivities of the respective image signal components of the first and second image signals, which represent picture elements in the corresponding radiation images, are calculated on the basis of the unsharp signals of the first and second image signals. Therefore, the values of the sensitivities of the respective image signal components of the first and second image signals, which represent picture elements in the corresponding radiation images, can be obtained such that the sensitivities may not be adversely affected by minute changes and noise in the image signals. Also, appropriate weight factors can be determined from the calculated values of the sensitivities.

BRIEF DESCRIPTION OF THE DRAWINGS

FIGS. 6A, 6B, and 6D through 6M are graphs showing the profiles of the images, which are shown in FIG. 5, along a predetermined direction, FIG. 7 is a graph showing the profile of a superposition image signal, FIG. 16 is a block diagram showing an apparatus for carrying out superposition processing.

DESCRIPTION OF THE PREFERRED EMBODIMENTS

The present invention will hereinbelow be described in further detail with reference to the accompanying drawings. First, embodiments of the method for forming an energy subtraction image in accordance with the present invention will be described below. In the embodiments described below, stimulable phosphor sheets are utilized as the recording media.

Figure 9:
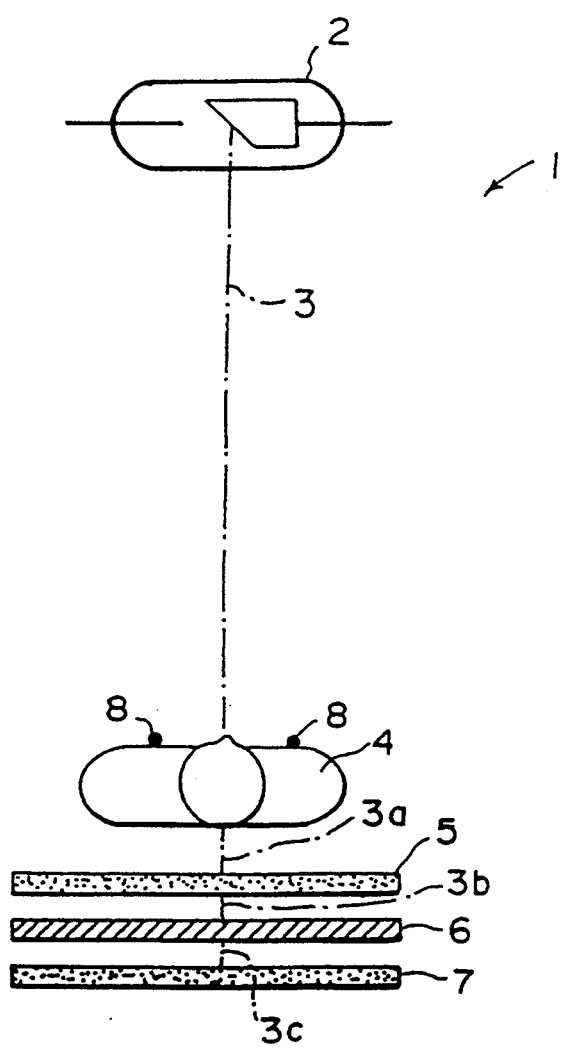
FIG. 9 is a schematic view showing an X-ray image recording apparatus.

FIG. 9 is a schematic view showing an X-ray image recording apparatus 1.

With reference to FIG. 9, X-rays 3 are produced by an X-ray tube 2 of the X-ray image recording apparatus 1 and irradiated to an object 4 (in this example, the chest of a human body). X-rays 3a, which have passed through the object 4, impinge upon a first stimulable phosphor sheet 5, and energy from the comparatively low energy components of the X-rays 3a is stored on the first stimulable phosphor sheet 5. In this manner, an X-ray image of the object 4 is stored on the first stimulable phosphor sheet 5. X-rays 3b, which have passed through the first stimulable phosphor sheet 5, then pass through a filter 6 for filtering out the low energy components of the X-rays. X-rays 3c, which have passed through the filter 6 and are composed of the high energy components, impinge upon a second stimulable phosphor sheet 7. In this manner, an X-ray image of the object 4 is stored on the second stimulable phosphor sheet 7. During the image recording operation, marks 8, 8 are placed on the object 4. The images of the marks 8, 8 are utilized in the course of adjusting the positions of the two X-ray images so that the two X-ray images coincide with each other.

In the X-ray image recording apparatus 1, the X-ray images are stored on the first stimulable phosphor sheet 5 and the second stimulable phosphor sheet 7 with a single, simultaneous recording operation. Alternatively, the two X-ray images may be recorded one after the other with two independent recording operations.

Figure 10:
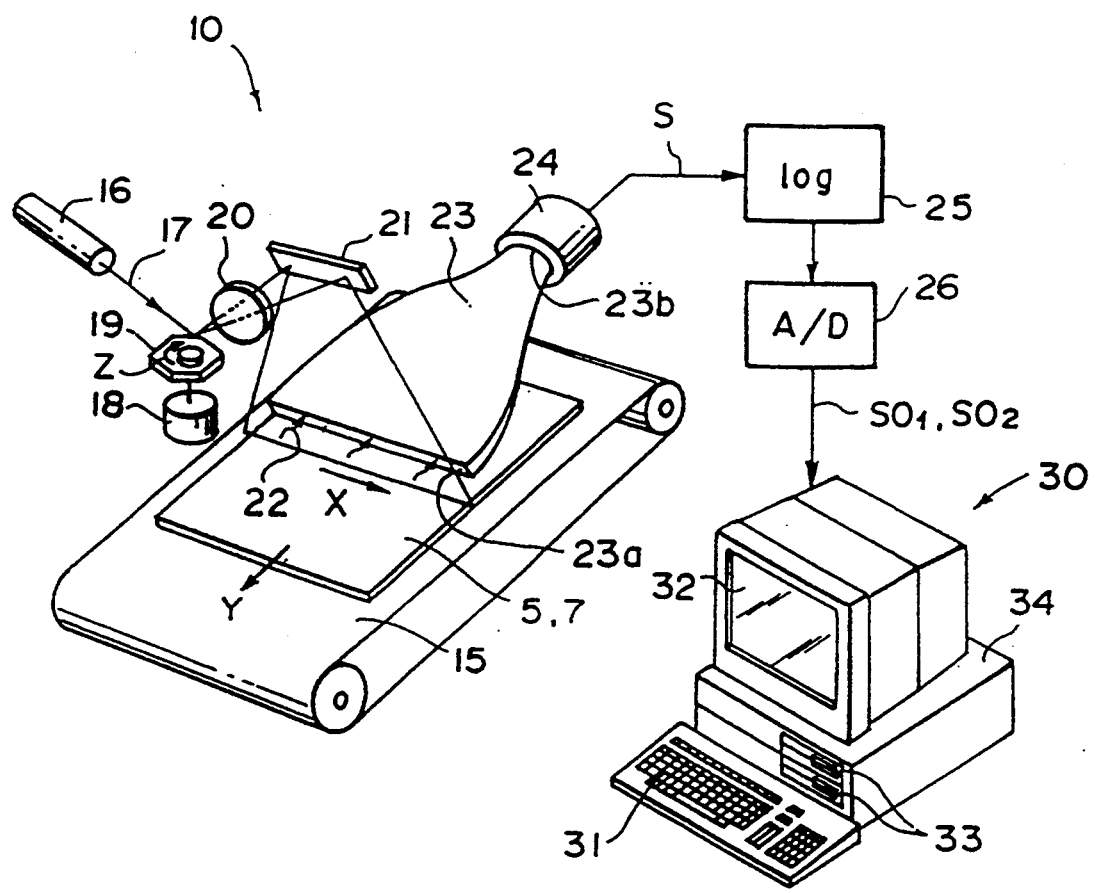
FIG. 10 is a perspective view showing an X-ray image read-out apparatus and an image processing and displaying apparatus, in which the method for forming an energy subtraction image in accordance with the present invention may be employed.

FIG. 10 is a perspective view showing an X-ray image read-out apparatus 10 and an image processing and displaying apparatus 30, in which the method for forming an energy subtraction image in accordance with the present invention may be employed.

After the first X-ray image and the second X-ray image have been stored respectively on the first stimulable phosphor sheet 5 and the second stimulable phosphor sheet 7 in the X-ray image recording apparatus 1 shown in FIG. 9, the first stimulable phosphor sheet 5 and the second stimulable phosphor sheet 7 are placed one after the other at a predetermined position in the X-ray image read-out apparatus 10 shown in FIG. 10. How the first X-ray image is read out from the first stimulable phosphor sheet 5 will be described hereinbelow.

With reference to FIG. 10, the first stimulable phosphor sheet 5 is conveyed in a sub-scanning direction indicated by the arrow Y by a sheet conveyance means 15, which is constituted of an endless belt, or the like, and which is operated by an operating means (not shown). A laser beam 17, which serves as stimulating rays, is produced by a laser beam source 16. The laser beam 17 is reflected and deflected by a rotating polygon mirror 19, which is being quickly rotated by a motor 18 in the direction indicated by the arrow Z. The laser beam 17 then passes through a converging lens 20, which may be constituted of an fθ lens, or the like. The direction of the optical path of the laser beam 17 is then changed by a mirror 21, and the laser beam 17 is caused to impinge upon the first stimulable phosphor sheet 5 and scan it in a main scanning direction indicated by the arrow X. The main scanning direction is approximately normal to the sub-scanning direction indicated by the arrow Y. When the first stimulable phosphor sheet 5 is exposed to the laser beam 17, the exposed portion of the first stimulable phosphor sheet 5 emits light 22 in an amount proportional to the amount of energy stored thereon during its exposure to the X-rays. The emitted light 22 is guided by a light guide member 23, and photoelectrically detected by a photomultiplier 24. The light guide member 23 is made from a light guiding material, such as an acrylic plate. The light guide member 23 has a linear light input face 23a, positioned to extend along the main scanning line on the first stimulable phosphor sheet 5, and a ring-shaped light output face 23b, positioned so that it is in close contact with a light receiving face of the photomultiplier 24. The emitted light 22, which has entered the light guide member 23 from its light input face 23a, is guided through repeated total reflection inside of the light guide member 23, emanates from the light output face 23b, and is received by the photomultiplier 24. In this manner, the amount of the emitted light 22, which amount represents the first X-ray image stored on the first stimulable phosphor sheet 5, is converted into an electric signal by the photomultiplier 24.

An analog signal S generated by the photomultiplier 24 is logarithmically amplified by a logarithmic amplifier 25, and fed into an A/D converter 26. The A/D converter 26 samples the analog signal S, and the sampled signal is converted into a digital image signal SO. The image signal SO thus obtained represents the first X-ray image, which was stored on the first stimulable phosphor sheet 5, and will hereafter be referred to as the first image signal SO1 (the first original image signal). The first image signal SO1 is stored in an internal memory of the image processing and displaying apparatus 30.

The image processing and displaying apparatus 30 is provided with a keyboard 31, from which various instructions are entered, and a CRT display device 32, which displays auxiliary information for instructions and a visible image represented by an image signal. The image processing and displaying apparatus 30 is also provided with a floppy disk drive unit 33, which receives and operates a floppy disk serving as an auxiliary storage medium, and a main body 34 which incorporates a CPU and the internal memory.

Thereafter, in the same manner as that described above, a second image signal SO2 (a second original image signal) is obtained which represents the second X-ray image stored on the second stimulable phosphor sheet 7. The second image signal SO2 is stored in the internal memory of the image processing and displaying apparatus 30.

Figure 1:
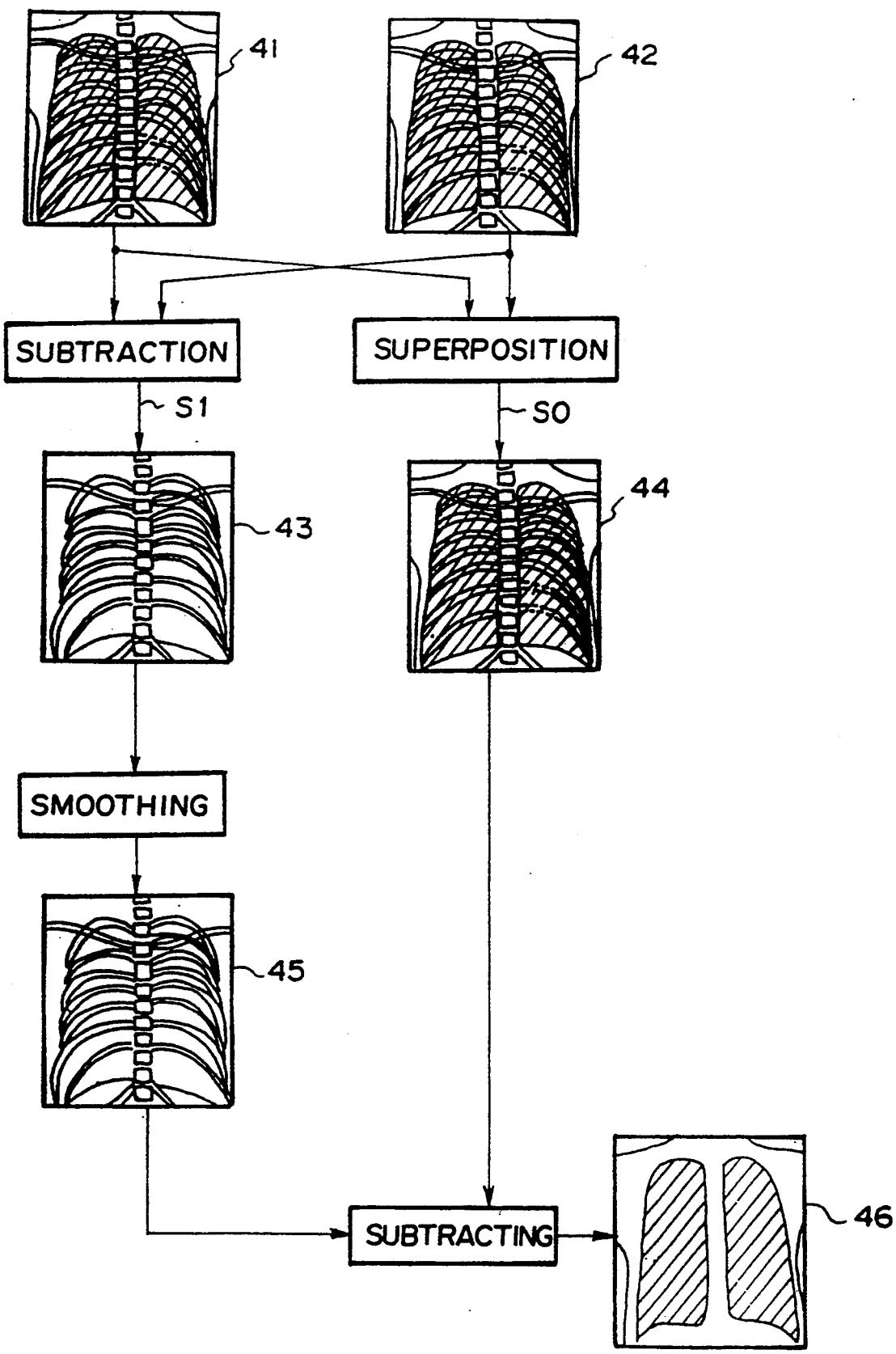
FIG. 1 is a flow chart showing the processes, which are carried out in an image processing and displaying apparatus.

FIG. 1 is a flow chart showing the processes, which are carried out in the image processing and displaying apparatus 30. The processes are carried out on the first image signal SO1 representing the first X-ray image and the second image signal SO2 representing the second X-ray image, which signals are stored in the internal memory of the image processing and displaying apparatus 30.

The first image signal SO1 and the second image signal SO2, which are stored in the internal memory of the image processing and displaying apparatus 30, represent a first X-ray image 41 and a second X-ray image 42 shown in FIG. 1. The first X-ray image 41 has been recorded with the comparatively low energy components of the X-rays. The second X-ray image 42 has been recorded with the comparatively high energy components of the X-rays. Both of the first X-ray image 41 and the second X-ray image 42 are original images composed of patterns of soft tissues and bones. The levels of image density of the soft tissue patterns and the bone patterns are different between the first X-ray image 41 and the second X-ray image 42.

The first image signal SO1 and the second image signal SO2 are read from the internal memory of the image processing and displaying apparatus 30 shown in FIG. 10. Position adjustment processing is then carried out on the first image signal SO1 and the second image signal SO2 such that the positions of the first X-ray image 41 represented by the first image signal SO1 and the second X-ray image 42 represented by the second image signal SO2 may coincide with each other. For this purpose, a method disclosed in, for example, U.S. Pat. No. 4,710,875 may be employed. With the position adjustment processing, one of the two X-ray images is linearly moved or rotated with respect to the other X-ray image until the images of the marks 8, 8 in one X-ray image, which marks are shown in FIG. 9, overlap the images of the marks 8, 8 in the other X-ray image.

Thereafter, a subtraction process is carried out on the first image signal SO1 and the second image signal SO2.

Specifically, X-ray absorption coefficients $\mu$ are classified into the following:

$\mu$LT: Absorption coefficient of soft tissues with respect to the low energy components of X-rays.

$\mu$HT: Absorption coefficient of soft tissues with respect to the high energy components of X-rays.

$\mu$LB: Absorption coefficient of bones with respect to the low energy components of X-rays.

$\mu$HB: Absorption coefficient of bones with respect to the high energy components of X-rays.

The first image signal SO1 and the second image signal SO2 are weighted, and the image signal components of the weighted image signals are subtracted from each other which represent the image information stored at corresponding picture elements in the two X-ray images. Thus a bone image signal S1 is obtained, which can be expressed as $$S1 = SO1 - \frac{\mu LT}{\mu HT} SO2 + C \qquad (11)$$

where C denotes a bias component. The bone image signal S1 represents a bone image 43 shown in FIG. 1, which image is composed of the bone patterns.

The first image signal SO1 and the second image signal SO2 may be weighted in a different way, and the image signal components of the weighted image signals may be subtracted from each other which represent the image information stored at corresponding picture elements in the two X-ray images. In this manner, a soft tissue image signal S2 can be obtained, which is expressed as $$S2 = \frac{\mu LB}{\mu HB} SO2 - SO1 + C' \qquad (12)$$

where C' denotes a bias component. The soft tissue image signal S2 represents a soft tissue image composed of the soft tissue patterns. However, in this embodiment, the operations for generating the soft tissue image signal S2 need not be carried out.

Also, a sensitivity Sk1 of the first image signal SO1 and a sensitivity Sk2 of the second image signal SO2 are calculated. The sensitivity corresponds to the photoelectric conversion factor, which represents to what image signal level a predetermined amount of emitted light is to be converted. The sensitivity serves as a parameter for determining the read-out conditions, under which an image signal is detected, and the image processing conditions, under which an image signal is to be processed. Operations for calculating the values of the read-out conditions and/or the image processing conditions are carried out by a group of algorithms which analyze an image signal. A large number of image signals detected from a large number of radiation images are statistically processed. The algorithms which calculate the read-out conditions and/or the image processing conditions are designed on the basis of the results obtained from this processing. As examples of the algorithms which have heretofore been employed, methods are known wherein a probability density function of an image signal is created and analyzed, and the read-out conditions and/or the image processing conditions are determined on the basis of the results of the analysis of the probability density function. Such examples of the algorithms are disclosed in, for example, U.S. Pat. No. 4,638,162 and Japanese Unexamined Patent Publication No. 61(1986)-280163. Therefore, how the sensitivity can be calculated will not herein be described in detail.

Figure 11:
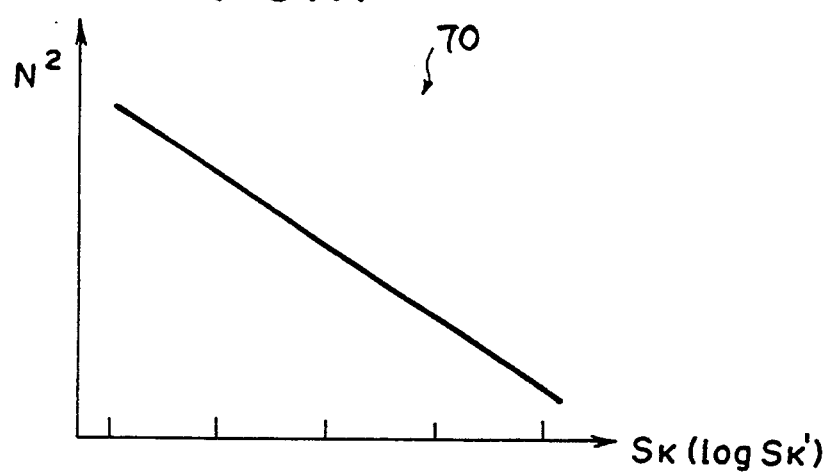
FIG. 11 is a graph showing the relationship between sensitivity and noise.

As indicated by line 70 shown in FIG. 11, the sensitivity Sk1 and the sensitivity Sk2, which are calculated in this embodiment, are expressed in terms of the logarithmic values of the sensitivity Sk1' and the sensitivity Sk2' detected from the image signals. Specifically, the following formulas obtain.

$$Sk1 = \log Sk1',$$

$$Sk2 = \log Sk2'$$

After the sensitivity Sk1 and the sensitivity Sk2 are calculated, the first image signal SO1 and the second image signal SO2 are weighted with the sensitivity Sk1 and the sensitivity Sk2. The image signal components of the weighted first and second image signals are then added to each other which represent corresponding picture elements in the two X-ray images. The weighted addition is represented by the formula $$SO = (Sk2/(Sk1+Sk2)) \times SO1 + (Sk1/(Sk1+Sk2)) \times SO2 \qquad (8'')$$

In this manner, a superposition image signal SO, which represents a superposition image 44, is obtained from the two image signals SO1 and SO2. Formula (8") corresponds to Formula (1), in which $N1^2$ is replaced by the sensitivity Sk1, and $N2^2$ is replaced by the sensitivity Sk2. Therefore, noise contained in the superposition image 44 is minimized, and the superposition image signal SO is advantageous for the subsequent processes.

In cases where the weighted addition is carried out by using the values of the sensitivities Sk1' and Sk2' before being converted into the sensitivities Sk1 and Sk2 having the logarithmic values, the superposition image signal SO may be generated with the formula $$SO = (\log Sk2'/(\log Sk1' + \log Sk2')) \times SO1 + (\log Sk1'/(\log Sk1' + \log Sk2')) \times SO2 \qquad (13)$$

In cases where graduations are used for the sake of convenience for the sensitivity Sk shown in FIG. 11

(e.g., in cases where graduations on the horizontal axis Sk″ shown in FIG. 11 are used), the relationship between Sk″ and Sk′ is expressed as $$Sk' = 4 \times 10^{4'sk''}$$

Therefore, in such cases, the superposition image signal SO may be generated with the formula $$SO = (4-Sk2'')/((4-Sk1'')+(4-Sk2'')) \times SO1 + (4-Sk1'')/((4-Sk1'')+(4-Sk2'')) \times SO2 \quad (14)$$

Thereafter, the bone image signal S1 is processed such that noise components contained in the bone image 43 may be eliminated.

Figure 2:
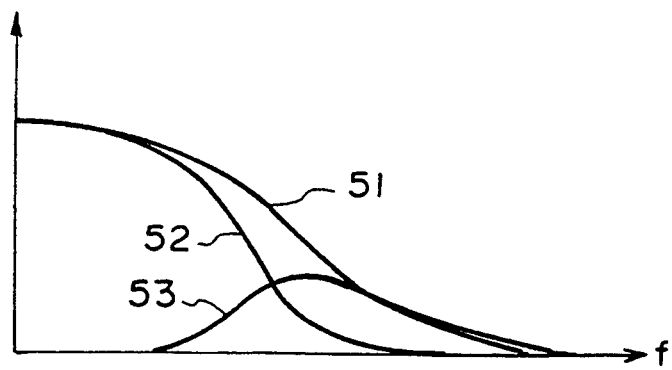
FIG. 2 is a graph showing spatial frequency spectra of a bone image and an image obtained by processing the bone image signal representing the bone image.

FIG. 2 is a graph showing spectra of a bone image and an image, which is obtained by processing the bone image signal representing the bone image, with respect to the spatial frequency, f.

In FIG. 2, curve 51 indicates the spectrum of the bone image 43, and curve 53 indicates the spectrum of noise components included in the bone image 43.

First, a smoothing process is carried out on the bone image signal S1. As the smoothing process, one of various processes may be employed. For example, a simple averaging process may be employed wherein the mean value of the values of the image signal components of an image signal, which represent the picture elements belonging to a predetermined region having a predetermined picture element in the middle, is calculated and employed as the value of the image signal component representing the predetermined picture element. Alternatively, a median filter process may be employed wherein the median value of the values of the image signal components of an image signal, which represent the picture elements belonging to a predetermined region having a predetermined picture element in the middle, is calculated and employed as the value of the image signal component representing the predetermined picture element. As another alternative, an edge keeping filter (V-filter) process may be employed wherein a predetermined region having a predetermined picture element in the middle is divided into a plurality of small regions, and the variance of the values of the image signal components corresponding to each small region is calculated. A small region associated with the smallest variance is then found, and the mean value of the values of the image signal components corresponding to the small region associated with the smallest variance is employed as the value of the image signal component representing the predetermined picture element. As a further alternative, a process may be employed wherein Fourier transformation is carried out on an image signal, the signal obtained from the Fourier transformation is subjected to an operation for removing high spatial frequency components corresponding to noise components, and thereafter inverse Fourier transformation is carried out.

However, the simple averaging process has the drawbacks in that edges in the image become unsharp. The median filter process has the drawbacks in that, because picture elements are interchanged, contour line-like artifacts often occur. The edge keeping filter process has the drawbacks in that honeycomb-like artifacts often occur. The Fourier transformation process has the drawbacks in that a long time is taken for operations to be carried out.

Therefore, in this embodiment, as will be described below, a smoothing process is carried out in which a filter adaptive to a probability density function is utilized. With the smoothing process, noise can be eliminated such that edges (i.e. step-like changes in density, which define boundaries among patterns of a plurality of different tissues of an object), which it is necessary to reproduce, may be kept sharp and no artifact may occur in the smoothed image. Also, noise can be eliminated quickly with simple operations.

Specifically, first, each of the picture elements in the bone image 43 is taken as a predetermined picture element, and the probability density function of the image signal components of the bone image signal S1 is generated, which represent a plurality of the picture elements belonging to a predetermined region having the predetermined picture element in the middle.

Figure 3A:
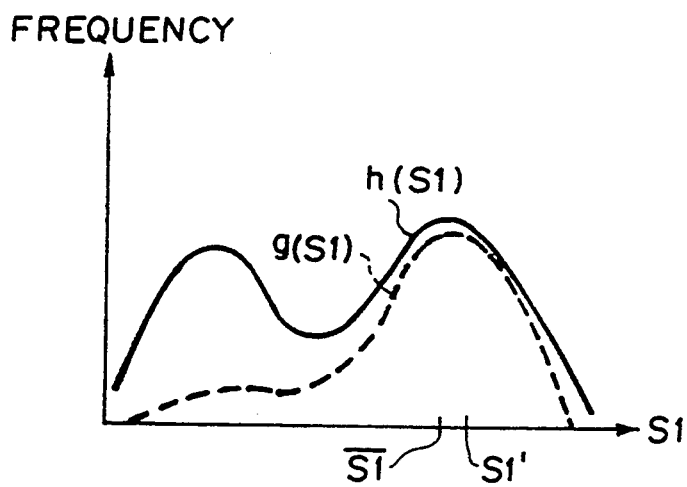
FIGS. 3A and 3B are graphs showing examples of probability density functions of image signal components, which image signal components represent a plurality of picture elements belonging to a predetermined region having a predetermined picture element in the middle.
Figure 3B:
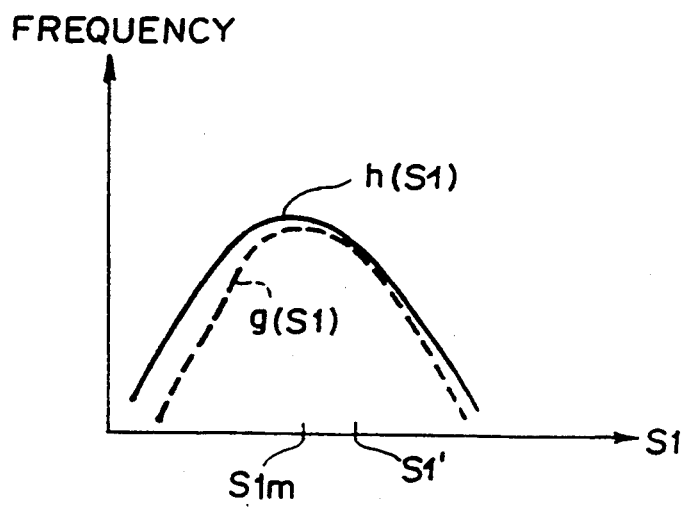
Figure 4:
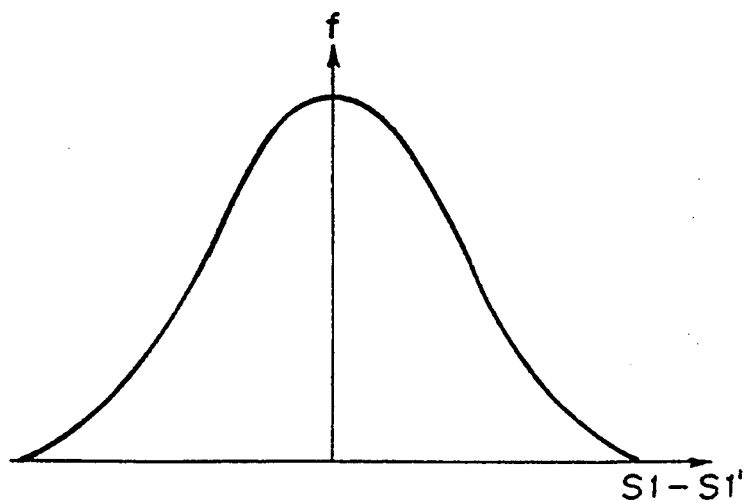
FIG. 4 is a graph showing an example of a function, in which the difference between the value of an image signal S1 and the value S1' of the image signal component representing a predetermined picture element located in the middle of a predetermined region serves as a variable.

FIGS. 3A and 3B are graphs showing examples of probability density functions of image signal components of the image signal S1, which image signal components represent a plurality of picture elements belonging to a predetermined region having a predetermined picture element in the middle. The image signal component representing the predetermined picture element has a value S1′. FIG. 4 is a graph showing an example of a function, in which the difference between the value of the image signal S1 and the value S1′ of the image signal component representing the predetermined picture element located in the middle of the predetermined region serves as a variable.

The probability density functions shown in FIGS. 3A and 3B are denoted by h(S1). Also, a function, the value of which decreases monotonously as the absolute value |S1−S1′| increases, e.g. the function shown in FIG. 4, is denoted by f(S1−S1′). The values of a function g(S1) representing how frequently the values of image signal components of an image signal occur, which image signal has been processed, are calculated with the formula $$g(S1) = h(S1) \times f(S1-S1') \quad (15)$$

In cases where the function h(S1) includes a plurality of projecting parts shown in FIG. 3A, the function g(S1) has the effects of extracting only of the projecting part, to which the image signal component having the value of S1′ and representing the predetermined picture element belongs.

After the values of the function g(S1) have been calculated with Formula (15), the values of the image signal components of the image signal S1, which image signal components represent the picture elements belonging to the predetermined region, are weighted with the values of the function g(S1). A calculation is then made to find a mean-level value S1m of the weighted values of the image signal components of the image signal S1. Specifically, by way of example, the moment of first order of the function g(S1) is calculated with the formula $$S1m = (S1) \times S1 dS1 / \int S1 dS1 \quad (16)$$

The picture elements in the bone image 43 are sequentially taken as the predetermined picture element, and the processes with Formulas (15) and (16) are carried out for all of the picture elements in the bone image 43. In this manner, a smoothed image signal S1m is generated. (As an aid in facilitating the explanation, the same reference numeral is utilized to indicate both the value of the image signal component representing each picture element and the image signal representing the whole image.) As indicated by curve 52 in FIG. 2, the smoothed image signal S1m is generated by primarily eliminating the high spatial frequency components from the bone image signal S1. As shown in FIG. 3A, as for a picture element located in the vicinity of an edge, the smoothed image signal S1m has the mean-level value of the values belonging only to the projecting part, to which said picture element belongs. Therefore, edges in the bone image 43 can be kept sharp.

Thereafter, the superposition image signal SO, which is expressed as Formula (8), Formula (13), or Formula (14) and represents the superposition image 44, and the smoothed image signal S1m are weighted. The image signal components of the weighted smoothed image signal S1m are subtracted from the image signal components of the weighted superposition image signal SO, which image signal components represent the image information stored at corresponding picture elements in the two X-ray images. Thus a soft tissue image signal S2' is obtained, which can be expressed as $$S2' = SO - \frac{\left(1 + \frac{\mu LB}{\mu HB}\right)}{2 \cdot \left(\frac{\mu LB}{\mu HB} - \frac{\mu LT}{\mu HT}\right)} S1m + C'' \quad (17)$$

where $C''$ denotes a bias component. The soft tissue image signal S2' represents a processed soft tissue image 46 shown in FIG. 1. The processed soft tissue image 46 has approximately the same image information as the soft tissue image expressed as Formula (12) and includes less noise components than the soft tissue image expressed as Formula (12).

The soft tissue image signal S2' which has been generated with Formula (17), is fed into the CRT display device 32 of the image processing and displaying apparatus 30. A visible image is reproduced from the soft tissue image signal S2' and displayed on the CRT display device 32.

In the embodiment described above, the soft tissue image signal S2 is generated by smoothing the bone image signal S1 and subtracting the smoothed signal from the original image signal representing the original image. In cases where a bone image is to be reproduced, the soft tissue image signal S2 is generated with Formula (12) and then smoothed. The smoothed signal is then subtracted from the original image signal representing the original image. In this manner, a bone image in which noise components have been reduced can be obtained.

A different embodiment of the method for forming an energy subtraction image in accordance with the present invention will be described hereinbelow.

Figure 5:
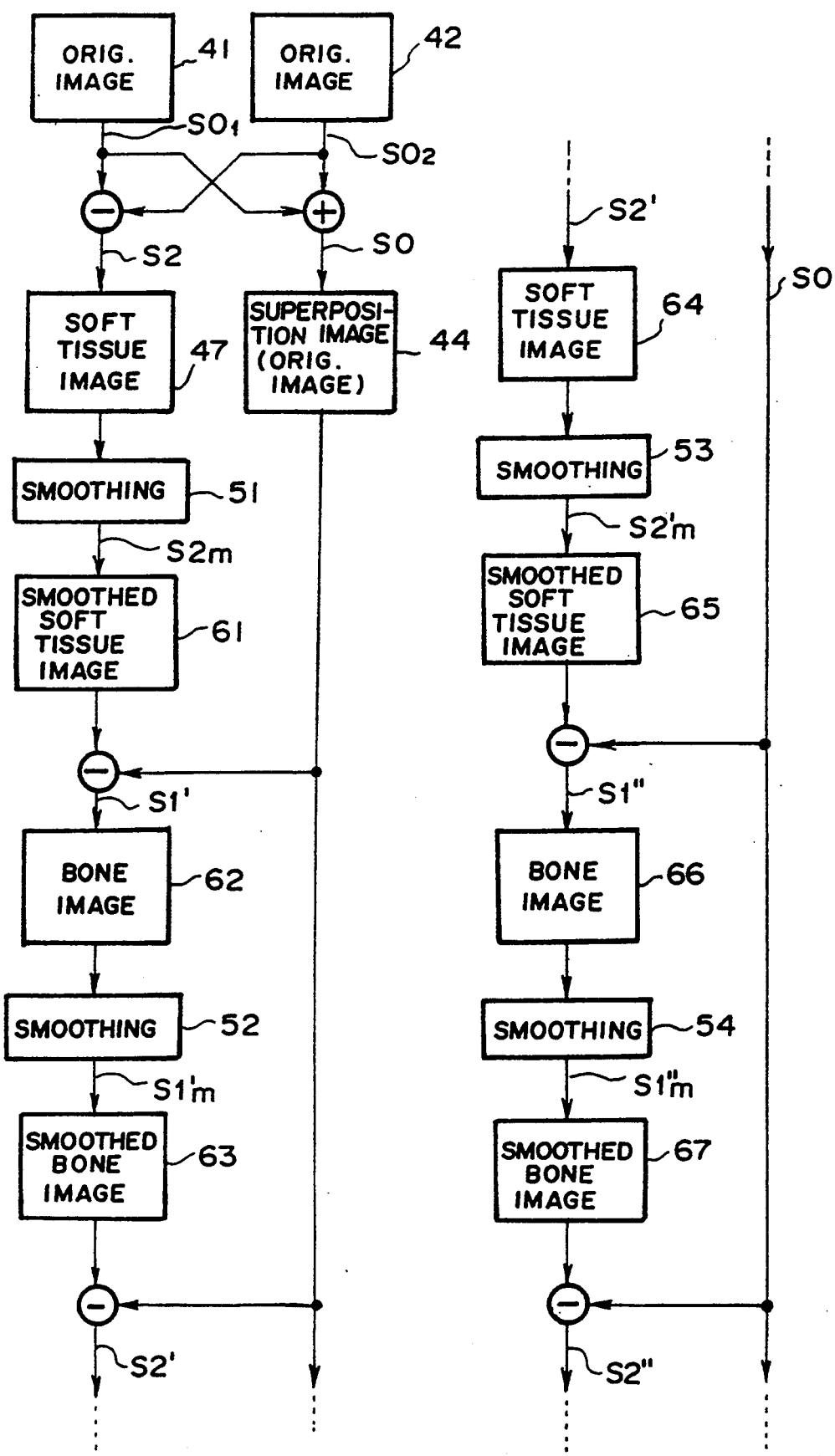
FIG. 5 is a flow chart showing the processes, which are carried out in a different embodiment of the method for forming an energy subtraction image in accordance with the present invention.

FIG. 5 is a flow chart showing the processes in a different embodiment of the method for forming an energy subtraction image in accordance with the present invention. FIGS. 6A, 6B, 6D through 6M and FIG. 7 are graphs showing the profiles of the images, which are shown in FIG. 5, along a predetermined direction.

In FIG. 5, similar elements are numbered with the same reference numerals with respect to FIG. 1.

FIGS. 6A and 6B show the profiles of the first X-ray image 41 and the second X-ray image 42, which are original images. Specifically, FIG. 6A shows how the values of the image signal components of the first image signal SO1 representing the first X-ray image 41 are distributed, which image signal components represent the picture elements located along a predetermined direction (x direction) in the first X-ray image 41. FIG. 6B shows how the values of the image signal components of the second image signal SO2 representing the second X-ray image 42 are distributed, which image signal components represent the picture elements located along the predetermined direction (x direction) in the second X-ray image 42. The levels of the first image signal SO1 and the second image signal SO2 are different from each other. However, each of the first image signal SO1 and the second image signal SO2 is composed of the image signal components, which represent the soft tissue patterns (corresponding to the hatched region in FIG. 6A or FIG. 6B) and have approximately uniform values, the image signal components, which represent the bone patterns and have values changing step-wise, and the random noise components. These three types of image signal components are superposed one upon another.

By carrying out the weighted subtraction process with Formula (12) on the first image signal SO1 representing the first X-ray image 41 (the original image) and the second image signal SO2 representing the second X-ray image 42 (the original image), the soft tissue image signal S2 representing the soft tissue image 47 is generated. Also, by carrying out the addition process with Formula (8''), Formula (13), or Formula (14) on the first image signal SO1 and the second image signal SO2, the superposition image signal SO representing the superposition image 44 is generated.

FIG. 7 shows how the values of the image signal components of the superposition image signal SO are distributed. Like the first image signal SO1 shown in FIG. 6A and the second image signal SO2 shown in FIG. 6B, the superposition image signal SO is composed of the image signal components, which represent the soft tissue patterns (corresponding to the hatched region in FIG. 7) and have approximately uniform values, the image signal components, which represent the bone patterns and have values changing step-wise, and the random noise components. These three types of image signal components are superposed one upon another. However, the superposition image signal SO includes less noise components than the first image signal SO1 shown in FIG. 6A and the second image signal SO2 shown in FIG. 6B.

FIG. 6D shows how the values of the image signal components of the soft tissue image signal S2, which has been generated with Formula (12), are distributed. The soft tissue image signal S2 is primarily composed of the image signal components, which represent the soft tissue patterns and have approximately uniform values. However, the soft tissue image signal S2 includes more random noise components than the first image signal SO1 shown in FIG. 6A and the second image signal SO2 shown in FIG. 6B.

FIG. 6E shows how the values of the image signal components of the bone image signal S1, which may be generated with Formula (11), are distributed. (In this embodiment, the bone image signal S1 need not be generated.) The bone image signal S1 is primarily composed of the image signal components, which represent the bone patterns and have values changing step-wise. However, like the soft tissue image signal S2 shown in FIG. 6D, the bone image signal S1 includes more random noise components than the first image signal SO1 shown in FIG. 6A and the second image signal SO2 shown in FIG. 6B.

As illustrated in FIG. 5, a smoothing process 51 is carried out on the soft tissue image signal S2, which represents the soft tissue image 47 and is distributed as shown in FIG. 6D. From the smoothing process 51, a smoothed soft tissue image signal S2m is obtained, which represents a smoothed soft tissue image 61 and is distributed in the pattern shown in FIG. 6F. With the smoothing process 51, the spatial frequency components higher than a frequency of, for example, 1.0 cycle/mm are eliminated from the soft tissue image signal S2 representing the soft tissue image 47.

Thereafter, the superposition image signal SO and the smoothed soft tissue image signal S2m are weighted, and the weighted smoothed soft tissue image signal S2m is subtracted from the weighted superposition image signal SO. In this manner, a bone image signal S1' is obtained, which represents a bone image 62. As illustrated in FIG. 6G, the bone image signal S1' includes less random noise components than the bone image signal S1 shown in FIG. 6E. However, the bone image signal S1' slightly includes the high spatial frequency components of the soft tissue image 47 due to the smoothing process carried out on the soft tissue image 47.

A smoothing process 52 is then carried out on the bone image signal S1', which has been generated in the manner described above. With the smoothing process 52, patterns having low contrast and falling within the spatial frequency region higher than, for example, 0.5 cycle/mm are eliminated from the bone image 62 (i.e. small changes in the bone image signal S1' are eliminated). For this purpose, by way of example, the bone image signal S1' may be processed with a filter described below. Specifically, a window having an area corresponding to 0.5 cycle/mm is determined for a predetermined picture element P0. From the image signal components of the bone image signal S1' representing the picture elements belonging to the window, the image signal components are then found the values of which fall within the range of:

the value of an image signal component S1o' representing the predetermined picture element P0±a predetermined value.

Thereafter, the mean value of the image signal components, which have thus been found, is calculated and employed as the value of a new image signal component S1o' representing the predetermined picture element P0. With the smoothing process 52, a smoothed bone image signal S1m' is obtained which represents a smoothed bone image 63. As illustrated in FIG. 6I, in the smoothed bone image signal S1m', the noise components have been reduced. Also, the high spatial frequency components of the soft tissue image 47 due to the smoothing process carried out on the soft tissue image 47 have been reduced. However, the rising part of the smoothed bone image signal S1m' becomes unsharp.

Thereafter, the superposition image signal SO and smoothed bone image signal S1m' are weighted, and weighted smoothed bone image signal S1m' is subtracted from the weighted superposition image signal SO. In this manner, a soft tissue image signal S2' is obtained which represents a soft tissue image 64. As illustrated in FIG. 6H, the soft tissue image signal S2' includes less noise components than the soft tissue image signal S2 shown in FIG. 6D. Also, because the rising part of the smoothed bone image signal S1m' shown in FIG. 6I is unsharp, the information representing the corresponding part of the bone image is included as noise in the soft tissue image signal S2'. However, the level of random noise and the level of the information, which represents the bone image and constitutes noise, are very low. Therefore, a series of the processes may be finished in this step. The soft tissue image signal S2' may be fed into the CRT display device 32 of the image processing and displaying apparatus 30 shown in FIG. 10, and a visible image may be reproduced from the soft tissue image signal S2' and displayed on the CRT display device 32.

However, in this embodiment, the same processes as those described above are repeated even further such that an image having better image quality may be obtained.

After the soft tissue image signal S2' representing the soft tissue image 64 has been generated, a smoothing process 53 is carried out on the soft tissue image signal S2'. From the smoothing process 53, a smoothed soft tissue image signal S2m' is obtained, which represents a smoothed soft tissue image 65 and is distributed in the pattern shown in FIG. 6J. With the smoothing process 53, the spatial frequency components higher than a frequency of, for example, 1.5 cycle/mm are eliminated from the soft tissue image signal S2'.

Thereafter, the superposition image signal SO and the smoothed soft tissue image signal S2m' are weighted, and the weighted smoothed soft tissue image signal S2m' is subtracted from the weighted superposition image signal SO. In this manner, a bone image signal S1" is obtained, which represents a bone image 66. As illustrated in FIG. 6K, the bone image signal S1" includes less random noise components and less information, which represents the soft tissue image and constitutes noise, than the bone image signal S1' shown in FIG. 6G. In cases where a bone image is to be reproduced, a visible image may be reproduced from the bone image signal S1" and reproduced on the CRT display device 32.

In this embodiment, a smoothing process 54 is then carried out on the bone image signal S1", which has been generated in the manner described above. From the smoothing process 54, a smoothed bone image signal S1m" is obtained, which represents a smoothed bone image 67 and is distributed in the pattern shown in FIG. 6M. With the smoothing process 54, patterns having low contrast and falling within the spatial frequency region higher than, for example, 1.0 cycle/mm are eliminated from the bone image 66.

Thereafter, the superposition image signal SO and the smoothed bone image signal S1m" are weighted, and weighted smoothed bone image signal S1m" is subtracted from the weighted superposition image signal SO. In this manner, a soft tissue image signal S2" is obtained. As illustrated in FIG. 6L, the soft tissue image signal S2" includes less random noise components and less information, which represents the bone image and constitutes noise, than the soft tissue image signal S2' shown in FIG. 6H.

In the manner described above, the smoothing processes and the weighted subtraction processes with respect to the superposition image signal SO are carried out repeatedly such that the bone images and soft tissue images, in which noise has been reduced sequentially, may be obtained alternately.

Figure 8:
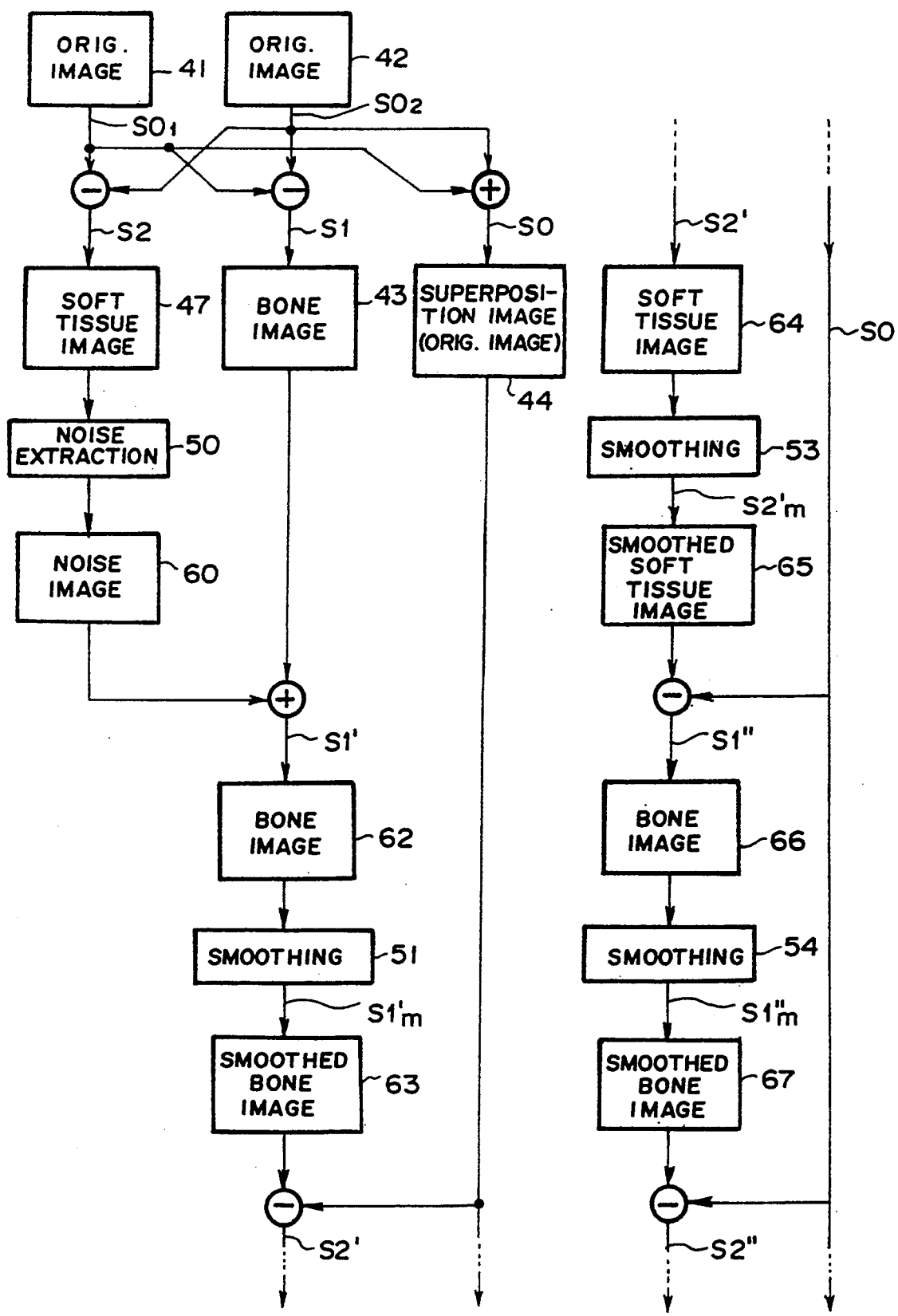
FIG. 8 is a flow chart showing the processes, which are substantially identical with those shown in FIG. 5.

FIG. 8 is a flow chart showing the processes in a still further embodiment, which processes are substantially identical with those shown in FIG. 5. In FIG. 8, similar elements are numbered with the same reference numerals with respect to FIG. 5.

In the embodiment of FIG. 8, the series of the processes for generating the bone image 62 in the embodiment of FIG. 5 (which processes correspond to the processes described above with reference to FIG. 1, except that the bone image and the soft tissue image are interchanged with each other) are replaced by the processes described below.

Specifically, the bone image signal S1 representing the bone image 43 and the soft tissue image signal S2 representing a soft tissue image 47 are generated by carrying out calculations with Formulas (11) and (12) from the first image signal SO1 representing the first X-ray image 41 and the second image signal SO2 representing the second X-ray image 42.

Thereafter, in the same manner as that in the embodiment described above, the smoothed image signal S2m representing the smoothed soft tissue image, in which the noise components included in the soft tissue image 47 have been reduced, is generated by processing the soft tissue image signal S2 in accordance with Formulas (15) and (16). The image signal components of the smoothed image signal S2m are then subtracted from the image signal components of the soft tissue image signal S2, which image signal components represent the image information stored at corresponding picture elements in the two X-ray images. In this manner, a noise signal SN representing a noise image 60, which is composed of only the noise components, is obtained. The noise signal SN can be expressed as $$SN = S2 - S2m \quad (18)$$

As indicated by curve 53 in FIG. 2, the noise signal SN is composed of only the noise components included in the soft tissue image 47. In the smoothed image signal S2m, even if the information representing the edges in the soft tissue image 47 has a level of spatial frequency as high as that of the noise components, the information representing the edges will not be lost. Therefore, by carrying out the calculations with Formula (18) to find the difference between the soft tissue image signal S2 and the smoothed image signal S2m, the noise signal SN can be obtained in which the information representing the edges has been completely canceled. Accordingly, the noise signal SN more accurately represents only the noise components of the soft tissue image 47 than when a smoothing process was carried out such that the information representing the edges may be lost.

Thereafter, the noise signal SN and the bone image signal S1 representing the bone image 43 are weighted, and the image signal components of the weighted image signals are added to each other, which image signal components represent the image information stored at corresponding picture elements in the two images. In this manner, a bone image signal S1' is obtained, which represents a processed bone image 62. The processed bone image 62 has approximately the same image information as the bone image 43 and includes less noise components than the bone image 43. In this embodiment, the weighted additions are carried out with the formula $$S1' = \left\{ \left(1 + \frac{\mu LB}{\mu HB}\right) S1 + \left(1 + \frac{\mu LT}{\mu HT}\right) SN \right\} / \quad (19)$$

$$2 \cdot \left( \frac{\mu LB}{\mu HB} - \frac{\mu LT}{\mu HT} \right)$$

Therefore, the noise components can be reduced even further.

Thereafter, the same processes as those shown in FIG. 5 are carried out.

In the embodiment of FIG. 8, only the initial processes in the embodiment of FIG. 5 are replaced by the processes described above. Such replacement may be carried out at an arbitrary stage of the processes carried out repeatedly. Such embodiments are substantially identical with the embodiment of FIG. 5. The method for forming an energy subtraction image in accordance with the present invention embraces various such, substantially identical embodiments wherein at least one stage of the processes is modified.

In the aforesaid embodiments of the method for forming an energy subtraction image in accordance with the present invention, a soft tissue image or a bone image is formed from X-ray images of the chest of a human body. However, the method for forming an energy subtraction image in accordance with the present invention is not limited to the formation of the soft tissue image or the bone image, but is applicable widely when either one or both of two images are to be obtained, in which the patterns of two different tissues of a single object have been emphasized or only such patterns are illustrated. For example, two such images may be an image, in which the patterns of mammary glands have been emphasized, and an image, in which the pattern of a malignant tumor has been emphasized.

Also, in the aforesaid embodiments of the method for forming an energy subtraction image in accordance with the present invention, stimulable phosphor sheets are used. However, the method for forming an energy subtraction image in accordance with the present invention is also applicable when other recording media, such as X-ray film (ordinarily combined with intensifying screens), are used.

Additionally, in the aforesaid embodiments of the method for forming an energy subtraction image in accordance with the present invention, the weight factors to be used during the weighted addition are determined from the sensitivity Sk1 of the first image signal SO1 and the sensitivity Sk2 of the second image signal SO2. Alternatively, noise N1 and noise N2 contained in the two original image signals SO1 and SO2 may be detected, and the weighted addition may be carried out by using noise N1 and noise N2 in accordance with Formula (1).

Further, in the aforesaid embodiments of the method for forming an energy subtraction image in accordance with the present invention, when the superposition image signal SO is to be obtained, the weight factors are determined from the sensitivities Sk1 and Sk2 of the two original image signals SO1 and SO2, which represent image information stored in the whole areas of the corresponding radiation images. Alternatively, the sensitivities Sk1 and Sk2 of the two original image signals SO1 and SO2 may be detected for the respective image signal components of the two original image signals SO1 and SO2 which represent image information stored at respective picture elements in the corresponding radiation images. How the sensitivity Sk1 of each of the image signal components of the original image signal SO1, which represent image information stored at respective picture elements in the corresponding radiation image, is calculated will be described hereinbelow.

Figure 12:
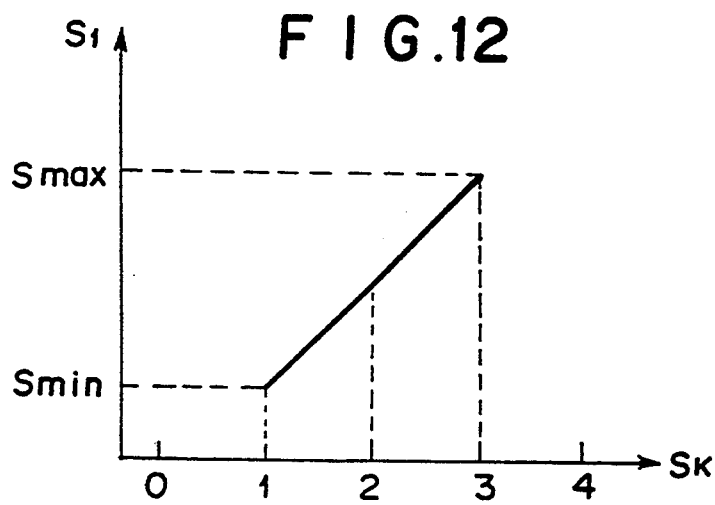
FIG. 12 is a graph showing the relationship between sensitivity and an image signal.
Figure 13:
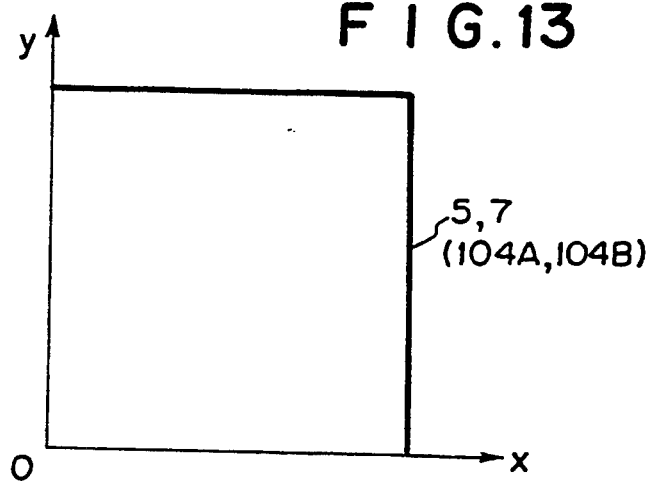
FIG. 13 is a graph showing a stimulable phosphor sheet on an x-y coordinate system.

First, the sensitivity Sk1 and a latitude Gp1 of the first image signal SO1 are calculated from the first image signal SO1 with the method disclosed in U.S. Pat. No. 4,638,162. The latitude corresponds to the ratio of the largest amount of emitted light, which is capable of being accurately converted into an image signal during the image read-out operation, to the smallest amount of emitted light, which is capable of being accuratelyconverted into an image signal during the image read-out operation. For example, in cases where the sensitivity Sk1 is calculated as being 2 and the latitude Gp1 is calculated as being 2, the sensitivity Sk1 and the image signal S1 have the relationship shown in FIG. 12. In cases where the picture element values are 10 bits, Smin=0, and Smax=1,023. When the x-y coordinates are set on the first stimulable phosphor sheet 5 as shown in FIG. 13, the sensitivity Sk1(x,y) at an arbitrary point having the coordinates (x,y) on the first stimulable phosphor sheet 5 can be calculated with the formula $$Sk1(x,y) = \frac{SO1(x,y) - \frac{Smax + Smin}{2}}{Smax - Smin} \times \frac{4}{Gp} + Sk1 \quad (20)$$

wherein SO1(x,y) represents the value of the image signal component of the first image signal SO1, which image signal component corresponds to an arbitrary point having the coordinates (x,y) on the first stimulable phosphor sheet 5.

In the manner described above, the sensitivity Sk1(x,y) corresponding to each of the picture elements in the radiation image, which was stored on the first stimulable phosphor sheet 5, is calculated with Formula (20). Thereafter, the sensitivity Sk2(x,y) corresponding to each of the picture elements in the radiation image, which was stored on the second stimulable phosphor sheet 7, is calculated from the second image signal SO2. The superposition image signal SO is then generated by carrying out the calculations expressed as $$SO(x,y) = Sk2(x,y)/(Sk1(x,y)+Sk2(x,y)) \cdot \times SO1 + Sk1(x,y)/(Sk1(x,y)+Sk2(x,y)) \times SO2 \quad (21)$$

In the manner described above, the values of the sensitivities, from which the weight factors are determined, are calculated for the respective image signal components of the first and second original image signals, which represent picture elements in the corresponding radiation images. Therefore, noise can be minimized for each of the picture elements in the resulting image such that the image quality of the image may not be adversely affected by variations in the amount of radiation, which impinged upon the recording medium, such as the stimulable phosphor sheet, after being irradiated to the object, for different positions on the recording medium.

Also, unsharp signals of the first and second original image signals may be generated, and the values of the sensitivities of the respective image signal components of the first and second original image signals, which represent picture elements in the corresponding radiation images, may be calculated on the basis of the unsharp signals of the first and second original image signals. In such cases, the values of the sensitivities of the respective image signal components of the first and second original image signals, which represent picture elements in the corresponding radiation images, can be obtained such that the sensitivities may not be adversely affected by minute changes and noise in the image signals. The unsharp signals can be obtained by carrying out one of various smoothing processes, such as an unsharp mask process, a median filter process, an FFT filter process, and a V filter process.

Embodiments of the superposition processing method for radiation images in accordance with the present invention will be described hereinbelow. In the embodiments described below, stimulable phosphor sheets are used as the recording media.

Figure 14:
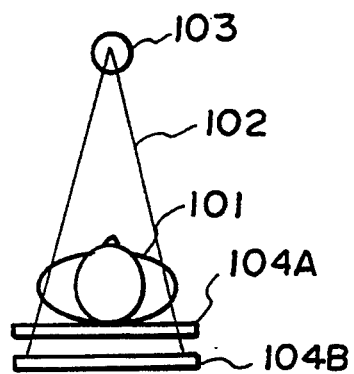
FIG. 14 is a schematic view showing how radiation images are recorded in an embodiment of the superposition processing method for radiation images in accordance with the present invention.

FIG. 14 shows how radiation 102, which has passed through a single object 101, is irradiated to two stimulable phosphor sheets 104A and 104B.

Specifically, the first stimulable phosphor sheet 104A and the second stimulable phosphor sheet 104B are superposed one upon the other, and a radiation source 103 is activated to produce the radiation 102. The radiation 102, which has been produced by the radiation source 103, passes through the object 101. The radiation 102, which has passed through the object 101, impinges upon the first stimulable phosphor sheet 104A and the second stimulable phosphor sheet 104B. In this manner, radiation images of the object 101 are stored on the first stimulable phosphor sheet 104A and the second stimulable phosphor sheet 104B.

Figure 15:
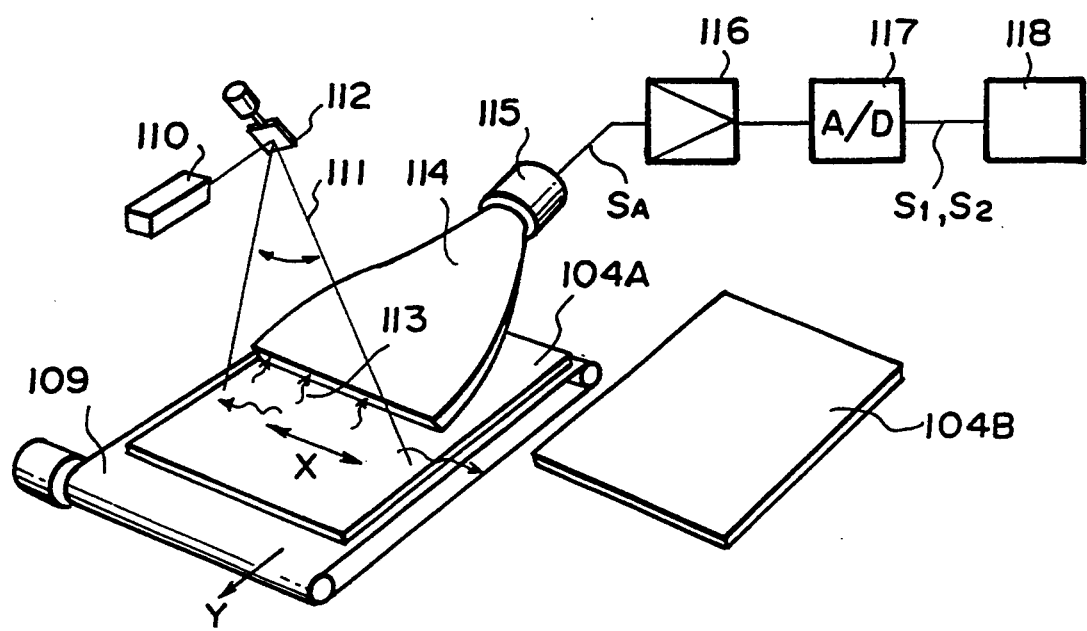
FIG. 15 is a schematic view showing how a radiation image is read out from a stimulable phosphor sheet, on which the radiation image has been stored.

Thereafter, the radiation images are read out from the firststimulable phosphor sheet 104A and the second stimulable phosphor sheet 104B by using an image read-out means shown in FIG. 15, and image signals representing the radiation images are thereby obtained. Specifically, the first stimulable phosphor sheet 104A is moved by a sub-scanning means 109 in the sub-scanning direction indicated by the arrow Y. The sub-scanning means 109 may be constituted of an endless belt, or the like. At the same time, a laser beam 111, which serves as stimulating rays, is produced by a laser beam source 110. The laser beam 111 is deflected by a scanning mirror 112 and caused to scan the stimulable phosphor sheet 104A in the main scanning directions indicated by the double-headed arrow X. When the stimulable phosphor sheet 104A is exposed to the laser beam 111, it emits light 113 in proportion to the amount of energy stored thereon during its exposure to the radiation 102. The emitted light 113 enters a light guide member 114, which is made from a transparent acrylic plate, from its one edge face. The emitted light 113 is guided through repeated total reflection inside of the light guide member 114 and detected by a photomultiplier 115. The photomultiplier 115 generates an image signal SA corresponding to the amount of the emitted light 113, i.e. representing the radiation image stored on the stimulable phosphor sheet 104A.

The image signal SA is logarithmically amplified by a logarithmic amplifier 116 and is then converted by an A/D converter 117 into a digital image signal S1. The digital image signal S1 is stored on a storage medium 118, such as a magnetic disk. Thereafter, the radiation image stored on the second stimulable phosphor sheet 104B is read out in the same manner as that described above. The digital image signal S2 representing the radiation image stored on the stimulable phosphor sheet 104B is stored on the storage medium 118.

Thereafter, a superposition processing is carried out on the image signals S1 and S2. FIG. 16 shows an apparatus for carrying out the superposition processing. First, the image signals S1 and S2 are read from an image file 118A and an image file 118B in the storage medium 118 and fed into a superposition operating circuit 119. The superposition operating circuit 119 calculates the sensitivity Sk1 of the image signal S1 and the sensitivity Sk2 of the image signal S2.

As indicated by line 70 shown in FIG. 11, the sensitivity Sk1 and the sensitivity Sk2, which are calculated in this embodiment, are expressed in terms of the logarithmic values of the sensitivity Sk1' and the sensitivity Sk2' detected from the image signals. Specifically, the following formulas obtain.

$$Sk1 = \log Sk1',$$

$$Sk2 = \log Sk2'$$

After the sensitivity Sk1 and the sensitivity Sk2 are calculated, the image signals S1 and S2 are weighted with the sensitivity Sk1 and the sensitivity Sk2 and are then added to each other. The weighted addition is represented by the formula $$S = (Sk2/(Sk1+Sk2)) \times S1 + (Sk1/(Sk1+Sk2)) \times S2 \quad (10)$$

In this manner, an addition signal S is obtained from the two image signals S1 and S2. Formula (10) corresponds to Formula (9), in which $N1^2$ is replaced by the sensitivity Sk1, and $N2^2$ is replaced by the sensitivity Sk2. Therefore, noise contained in the addition signal S is minimized.

In cases where the weighted addition is carried out by using the values of the sensitivities Sk1' and Sk2' before being converted into the sensitivities Sk1 and Sk2 having the logarithmic values, the addition signal S may be generated with the formula $$S = (\log Sk2''/(\log Sk1' + \log Sk2')) \times S1 + (\log Sk1'/(\log Sk1' + \log Sk2')) \times S2 \quad (10')$$

In cases where graduations are used for the sake of convenience for the sensitivity Sk shown in FIG. 11 (e.g., in cases where graduations on the horizontal axis Sk'' shown in FIG. 11 are used), the relationship between Sk'' and Sk' is expressed as $$Sk' = 4 \times 10^{4-Sk''}$$

Therefore, in such cases, the addition signal S may be generated with the formula $$S = (4-Sk2'')/((4-Sk1'')+(4-Sk2'')) \times S1 + (4-Sk1'')/((4-Sk1'')+(4-Sk2'')) \times S2 \quad (10'')$$

After the addition signal S is obtained in the manner described above, the addition signal S is fed into an image processing circuit 120 and subjected therein to image processing, such as gradation processing and frequency processing. The addition signal S, which has been obtained from the image processing circuit 120, is fed into an image reproducing apparatus 121 and used during reproduction of a radiation image. When the radiation image is reproduced from the addition signal S, a radiation image can be obtained in which noise has been minimized and which has good image quality.

Alternatively, the sensitivities Sk1 and Sk2 of the two image signals S1 and S2 may be detected for the respective image signal components of the two image signals S1 and S2 which represent image information stored at respective picture elements in the corresponding radiation images. How the sensitivity Sk1 of each of the image signal components of the image signal S1, which represent image information stored at respective picture elements in the corresponding radiation image, is calculated will be described hereinbelow.

First, the sensitivity Sk1 and a latitude Gp1 of the image signal S1 are calculated from the image signal S1 with the method disclosed in U.S. Pat. No. 4,638,162. For example, in cases where the sensitivity Sk1 is calculated as being 2 and the latitude Gp1 is calculated as being 2, the sensitivity Sk1 and the image signal S1 have the relationship shown in FIG. 12. In cases where the picture element values are 10 bits, Smin=0, and Smax=1,023. When the x-y coordinates are set on the stimulable phosphor sheet 104A as shown in FIG. 13, the sensitivity Sk1(x,y) at an arbitrary point having the coordinates (x,y) on the stimulable phosphor sheet 104A can be calculated with the formula $$Sk1(x,y) = \frac{S1(x,y) - \frac{Smax + Smin}{2}}{Smax - Smin} \times \frac{4}{Gp} + Sk1 \quad (21)$$

wherein S1(x,y) represents the value of the image signal component of the image signal S1, which image signal component corresponds to an arbitrary point having the coordinates (x,y) on the stimulable phosphor sheet 104A.

In the manner described above, the sensitivity Sk1(x,y) corresponding to each of the picture elements in the radiation image, which was stored on the stimulable phosphor sheet 104A, is calculated with Formula (22). Thereafter, the sensitivity Sk2(x,y) corresponding to each of the picture elements in the radiation image, which was stored on the stimulable phosphor sheet 104B, is calculated from the image signal S2. The addition signal S is then generated by carrying out the calculations expressed as $$S(x,y) = Sk2(x,y)/(Sk1(x,y)+Sk2(x,y)) \times S1 + Sk1(x,y)/(Sk1(x,y)+Sk2(x,y)) \times S2 \quad (23)$$

In the manner described above, the values of the sensitivities, from which the weight factors are determined, are calculated for the respective image signal components of the image signals, which represent picture elements in the corresponding radiation images. Therefore, noise can be minimized for each of the picture elements in the resulting image such that the image quality of the image may not be adversely affected by variations in the amount of radiation, which impinged upon the recording medium, such as the stimulable phosphor sheet, after being irradiated to the object, for different positions on the recording medium.

Also, unsharp signals of the two image signals may be generated, and the values of the sensitivities of the respective image signal components of the two image signals, which represent picture elements in the corresponding radiation images, may be calculated on the basis of the unsharp signals of the two image signals. In such cases, the values of the sensitivities of the respective image signal components of the two image signals, which represent picture elements in the corresponding radiation images, can be obtained such that the sensitivities may not be adversely affected by minute changes and noise in the image signals.

In the aforesaid embodiments of the superposition processing method for radiation images in accordance with the present invention, the weight factors to be used during the weighted addition are determined from the sensitivity Sk1 of the image signal S1 and the sensitivity Sk2 of the image signal S2. Alternatively, noise N1 and noise N2 contained in the two image signals S1 and S2 may be detected, and the weighted addition may be carried out by using noise N1 and noise N2 in accordance with Formula (9).

Also, in the aforesaid embodiments of the superposition processing method for radiation images in accordance with the present invention, the sensitivity is calculated with the method disclosed in U.S. Pat. No. 4,638,162 and Japanese Unexamined Patent Publication No. 61(1986)-280163. Alternatively, any of other methods, e.g., a method using a neural network, may be utilized for this purpose.

Additionally, in the aforesaid embodiments of the superposition processing method for radiation images in accordance with the present invention, the superposition processing is carried out on the image signals, which have been detected from the stimulable phosphor sheets. The superposition processing method for radiation images in accordance with the present invention is also applicable when the superposition processing is carried out on image signals obtained from other types of recording media, such as image signals detected from sheets of X-ray film or image signals obtained from an image intensifier.

What is claimed is:

1. A method for forming an energy subtraction image comprising the steps of:
   i) after two kinds of radiation images of an object are formed with two kinds of radiation having different energy levels, the object being constituted of a plurality of tissues exhibiting different levels of radiation absorptivity with respect to the two kinds of radiation having different energy levels,
   irradiating said two kinds of radiation images with image detection signals and detecting first and second original image signals based on said image detection signals and representing the two kinds of said radiation images,
   ii) generating a superposition image signal by carrying out a weighted addition expressed as $$S=(N2^2/(N1^2+N2^2))\times SO1+(N1^2/(N1^2+N2^2))\times SO2$$

wherein SO1 represents said first original image signal, N1 represents noise contained in said first original image signal, SO2 represents said second original image signal, and N2 represents noise contained in said second original image signal,
   iii) generating a first image signal, which represents a first image primarily composed of patterns of first tissues of said object, by subtracting said first original image signal and said second original image signal from each other,
   iv) generating a first smoothed image signal by smoothing said first image signal, said first smoothed image signal representing a first smoothed image in which noise components of said first image have been reduced or eliminated, and
   v) generating a second image signal by subtracting said superposition image signal and said first smoothed image signal from each other, said second image signal representing a second image primarily composed of patterns of second tissues of said object.

2. A method for forming an energy subtraction image as defined in claim 1 wherein said superposition image signal is generated by carrying out a weighted addition expressed as $$S=(Sk2/(Sk1+Sk2))\times SO1+(Sk1/(Sk1+Sk2))\times SO2$$

wherein SO1 represents said first original image signal, Sk1 represents a sensitivity of said first original image signal, SO2 represents said second original image signal, and Sk2 represents a sensitivity of said second original image signal.

3. A method for forming an energy subtraction image as defined in claim 1 wherein said superposition image signal is generated by calculating a sensitivity Sk1 of each of image signal components of said first original image signal, which represent picture elements in the corresponding radiation image, and a sensitivity Sk2 of each of image signal components of said second original image signal, which represent picture elements in the corresponding radiation image, on the basis of said first original image signal SO1 and said second original image signal SO2, and
carrying out a weighted addition on the image signal components of said first original image signal and said second original image signal, which represent corresponding picture elements in the two kinds of said radiation images, said weighted addition being expressed as $$S=(Sk2/(Sk1+Sk2))\times SO1+(Sk1/(Sk1+Sk2))\times SO2$$

4. A method for forming an energy subtraction image as defined in claim 1 wherein said superposition image signal is generated by generating an unsharp signal of said first original image signal SO1 and an unsharp signal of said second original image signal SO2,
calculating a sensitivity Sk1 of each of image signal components of said first original image signal, which represent picture elements in the corresponding radiation image, and a sensitivity Sk2 of each of image signal components of said second original image signal, which represent picture elements in the corresponding radiation image, on the basis of said unsharp signal of said first original image signal SO1 and said unsharp signal of said second original image signal SO2, and
carrying out a weighted addition on the image signal components of said first original image signal and said second original image signal, which represent corresponding picture elements in the two kinds of said radiation images, said weighted addition being expressed as $$S=(Sk2/(Sk1+Sk2))\times SO1+(Sk1/(Sk1+Sk2))\times SO2$$

5. A method for forming an energy subtraction image as defined in claim 1 wherein the two kinds of said radiation images have been stored on stimulable phosphor sheets.

6. A method for forming an energy subtraction image as defined in claim 5 wherein each of said first and second original image signals is obtained by exposing each of said stimulable phosphor sheets to stimulating rays, which cause said stimulable phosphor sheet to emit light in proportion to the amount of energy stored thereon during its exposure to the radiation, and photoelectrically detecting the emitted light.

7. A method for forming an energy subtraction image as defined in claim 6 wherein said stimulating rays are a laser beam.

8. A method for forming an energy subtraction image as defined in claim 1 wherein the two kinds of said radiation images have been recorded on sheets of photographic film.

9. A method for forming an energy subtraction image comprising the steps of:
  i) after two kinds of radiation images of an object are formed with two kinds of radiation having different energy levels, the object being constituted of a plurality of tissues exhibiting different levels of radiation absorptivity with respect to the two kinds of radiation having different energy levels,
  irradiating said two kinds of radiation images with image detection signals and detecting first and second original image signals based on said image detection signals and representing the two kinds of said radiation images,
  ii) generating a superposition image signal by carrying out a weighted addition expressed as $$S = (N2^2/(N1^2+N2^2)) \times SO1 + (N1^2/(N1^2+N2^2)) \times SO2$$

wherein SO1 represents said first original image signal, N1 represents noise contained in said first original image signal, SO2 represents said second original image signal, and N2 represents noise contained in said second original image signal,
  iii) carrying out a first process for generating a first image signal, which represents a first image primarily composed of patterns of first tissues of said object, by subtracting said first original image signal and said second original image signal from each other,
  iv) thereafter carrying out a second process, which comprises the steps of:
    a) generating a first smoothed image signal by smoothing said first image signal, said first smoothed image signal representing a first smoothed image in which noise components of said first image have been reduced, and
    b) generating a second image signal by subtracting said superposition image signal and said first smoothed image signal from each other, said second image signal representing a second image primarily composed of patterns of second tissues of said object, and
  v) thereafter carrying out a third process, which comprises the steps of:
    a) generating a second smoothed image signal by smoothing said second image signal, said second smoothed image signal representing a second smoothed image in which noise components of said second image have been reduced, and
    b) generating a new first image signal by subtracting said superposition image signal and said second smoothed image signal from each other, said new first image signal representing a new first image primarily composed of the patterns of said first tissues of said object.

10. A method for forming an energy subtraction image as defined in claim 9 wherein said superposition image signal is generated by carrying out a weighted addition expressed as $$S = (Sk2/(Sk1+Sk2)) \times SO1 + (Sk1/(Sk1+Sk2)) \times SO2$$

wherein SO1 represents said first original image signal, Sk1 represents a sensitivity of said first original image signal, SO2 represents said second original image signal, and Sk2 represents a sensitivity of said second original image signal.

11. A method for forming an energy subtraction image as defined in claim 9 wherein said superposition image signal is generated by calculating a sensitivity Sk1 of each of image signal components of said first original image signal, which represent picture elements in the corresponding radiation image, and a sensitivity Sk2 of each of image signal components of said second original image signal, which represent picture elements in the corresponding radiation image, on the basis of said first original image signal SO1 and said second original image signal SO2, and
  carrying out a weighted addition on the image signal components of said first original image signal and said second original image signal, which represent corresponding picture elements in the two kinds of said radiation images, said weighted addition being expressed as $$S = (Sk2/(Sk1+Sk2)) \times SO1 + (Sk1/(Sk1+Sk2)) \times SO2$$

12. A method for forming an energy subtraction image as defined in claim 9 wherein said superposition image signal is generated by generating an unsharp signal of said first original image signal SO1 and an unsharp signal of said second original image signal SO2,
  calculating a sensitivity Sk1 of each of image signal components of said first original image signal, which represent picture elements in the corresponding radiation image, and a sensitivity Sk2 of each of image signal components of said second original image signal, which represent picture elements in the corresponding radiation image, on the basis of said unsharp signal of said first original image signal SO1 and said unsharp signal of said second original image signal SO2, and
  carrying out a weighted addition on the image signal components of said first original image signal and said second original image signal, which represent corresponding picture elements in the two kinds of said radiation images, said weighted addition being expressed as $$S = (Sk2/(Sk1+Sk2)) \times SO1 + (Sk1/(Sk1+Sk2)) \times SO2$$

13. A method for forming an energy subtraction image as defined in claim 9 wherein the two kinds of said radiation images have been stored on stimulable phosphor sheets.

14. A method for forming an energy subtraction image as defined in claim 13 wherein each of said first and second original image signals is obtained by exposing each of said stimulable phosphor sheets to stimulating rays, which cause said stimulable phosphor sheet to emit light in proportion to the amount of energy stored thereon during its exposure to the radiation, and photoelectrically detecting the emitted light.

15. A method for forming an energy subtraction image as defined in claim 14 wherein said stimulating rays are a laser beam.

16. A method for forming an energy subtraction image as defined in claim 9 wherein the two kinds of said radiation images have been recorded on sheets of photographic film.

17. A superposition processing method for radiation images, comprising the steps of:
irradiating two kinds of radiation images of a single object, each present on a medium, with image detection signals and detecting, based on said image detection signals, first and second image signals, each of which comprising a series of image signal components and which represent corresponding picture elements in said radiation images; and
adding the image signal components of the first and second image signals to each other in accordance with the following equation:

$$S = (N2^2/(N1^2 + N2^2)) \times S1 + (N1^2/(N1^2 + N2^2)) \times S2$$

wherein S1 represents the first image signal, N1 represents noise contained in the first image signal, S2 represents the second image signal, N2 represents noise contained in the second image signal, and S represents the addition signal.

18. A superposition processing method for radiation images as defined in claim 17 wherein the radiation images have been stored on stimulable phosphor sheets.

19. A superposition processing method for radiation images as defined in claim 18 wherein each of the first and second image signals is obtained by exposing each of said stimulable phosphor sheets to stimulating rays, which cause said stimulable phosphor sheet to emit light in proportion to the amount of energy stored thereon during its exposure to the radiation, and photoelectrically detecting the emitted light.

20. A superposition processing method for radiation images as defined in claim 19 wherein said stimulating rays are a laser beam.

21. A superposition processing method for radiation images as defined in claim 17 wherein the radiation images have been recorded on sheets of photographic film.

22. A superposition processing apparatus for radiation images comprising:
means for irradiating two kinds of radiation images of a single object, each present on a medium, with image detection signals and detecting, based on said image detection signals first and second image signals, each of which is made up of a series of image signal components and which represent corresponding picture elements in said radiation images; and
addition means for adding the image signal components of the first and second image signals to each other in accordance with the following equation:

$$S = (N2^2/(N1^2 + N2^2)) \times S1 + (N1^2/(N1^2 + N2^2)) \times S2$$

wherein S1 represents the first image signal, N1 represents noise contained in the first image signal, S2 represents the second image signal, N2 represents noise contained in the second image signal, and S represents the addition signal.

23. A superposition processing apparatus for radiation images as defined in claim 22 wherein the radiation images have been stored on stimulable phosphor sheets.

24. A superposition processing apparatus for radiation images as defined in claim 23 wherein each of the first and second image signals is obtained by exposing each of said stimulable phosphor sheets to stimulating rays, which cause said stimulable phosphor sheet to emit light in proportion to the amount of energy stored thereon during its exposure to the radiation, and photoelectrically detecting the emitted light.

25. A superposition processing apparatus for radiation images as defined in claim 24 wherein said stimulating rays are a laser beam.

26. A superposition processing apparatus for radiation images as defined in claim 22 wherein the radiation images have been recorded on sheets of photographic film.

27. A superposition processing method for radiation images, comprising the steps of:
irradiating two kinds of radiation images of a single object, each present on a medium, with image detection signals and detecting, based on said image detection signals, first and second image signals, each of which comprising a series of image signal components and which represent corresponding picture elements in said radiation images; and
adding the image signal components of the first and second image signals to each other in accordance with the following equation:

$$S = (Sk2/(Sk1 + Sk2)) \times S1 + (Sk1/(Sk1 + Sk2)) \times S2$$

wherein S1 represents the first image signal, Sk1 represents a sensitivity of the first image signal, S2 represents the second image signal, Sk2 represents a sensitivity of the second image signal, and S represents the addition signal.

28. A superposition processing method for radiation images as defined in claim 27 wherein the radiation images have been stored on stimulable phosphor sheets.

29. A superposition processing method for radiation images as defined in claim 28 wherein each of the first and second image signals is obtained by exposing each of said stimulable phosphor sheets to stimulating rays, which cause said stimulable phosphor sheet to emit light in proportion to the amount of energy stored thereon during its exposure to the radiation, and photoelectrically detecting the emitted light.

30. A superposition processing method for radiation images as defined in claim 29 wherein said stimulating rays are a laser beam.

31. A superposition processing method for radiation images as defined in claim 27 wherein the radiation images have been recorded on sheets of photographic film.

32. A superposition processing apparatus for radiation images comprising:
means for irradiating two kinds of radiation images of a single object, each present on a medium, with image detection signals and detecting, based on said image detection signals first and second image signals, each of which is made up of a series of image signal components and which represent corresponding picture elements in said radiation images; and addition means for adding the image signal components of the first and second image signals to each other in accordance with the following equation:

$$S=(Sk2/(Sk1+Sk2))\times S1+(Sk1/(Sk1+Sk2))\times S2$$

wherein S1 represents the first image signal, Sk1 represents a sensitivity of the first image signal, S2 represents the second image signal, Sk2 represents a sensitivity of the second image signal, and S represents the addition signal.

33. A superposition processing apparatus for radiation images as defined in claim 32 wherein the radiation images have been stored on stimulable phosphor sheets.

34. A superposition processing apparatus for radiation images as defined in claim 33 wherein each of the first and second image signals is obtained by exposing each of said stimulable phosphor sheets to stimulating rays, which cause said stimulable phosphor sheet to emit light in proportion to the amount of energy stored thereon during its exposure to the radiation, and photoelectrically detecting the emitted light.

35. A superposition processing apparatus for radiation images as defined in claim 34 wherein said stimulating rays are a laser beam.

36. A superposition processing apparatus for radiation images as defined in claim 32 wherein the radiation images have been recorded on sheets of photographic film.

37. A superposition processing method for radiation images, comprising the steps of:
   i) irradiating two kinds of radiation images of a single object, each present on a medium, with image detection signals and detecting, based on said image detection signals, first and second image signals, each of which comprising a series of image signal components and which represent corresponding picture elements in said radiation images;
   ii) calculating a sensitivity Sk1 of each of the image signal components of the first image signal and a sensitivity Sk2 of each of the image signal components of the second image signal on the basis of the first image signal S1 and the second image signal S2; and
   iii) adding the image signal components of the first image signal and the second image signal in accordance with the following equation to obtain an addition signal S:

$$S=(Sk2/(Sk1+Sk2))\times S1+(Sk1/(Sk1+Sk2))\times S2.$$

38. A superposition processing method for radiation images as defined in claim 37 wherein the radiation images have been stored on stimulable phosphor sheets.

39. A superposition processing method for radiation images as defined in claim 38 wherein each of the first and second image signals is obtained by exposing each of said stimulable phosphor sheets to stimulating rays, which cause said stimulable phosphor sheet to emit light in proportion to the amount of energy stored thereon during its exposure to the radiation, and photoelectrically detecting the emitted light.

40. A superposition processing method for radiation images as defined in claim 39 wherein said stimulating rays are a laser beam.

41. A superposition processing method for radiation images as defined in claim 37 wherein the radiation images have been recorded on sheets of photographic film.

42. A superposition processing apparatus for radiation images comprising:
   means for irradiating two kinds of radiation images of a single object, each present on a medium, with image detection signals and detecting, based on said image detection signals, first and second image signals, each of which comprising a series of image signal components and which represent corresponding picture elements in said radiation images; and means for generating an addition signal based on the image signal components of the first and second image signals, comprising:
   i) an operation device for calculating a sensitivity Sk1 of each of the image signal components of the first image signal and a sensitivity Sk2 of each of the image signal components of the second image signal on the basis of the first image signal S1 and the second image signal S2; and
   ii) an addition device for adding the image signal components of the first image signal and the second image signal in accordance with the following equation to obtain an addition signal S:

$$S=(Sk2/(Sk1+Sk2))\times S1+(Sk1/(Sk1+Sk2))\times S2.$$

43. A superposition processing apparatus for radiation images as defined in claim 42 wherein the radiation images have been stored on stimulable phosphor sheets.

44. A superposition processing apparatus for radiation images as defined in claim 43 wherein each of the first and second image signals is obtained by exposing each of said stimulable phosphor sheets to stimulating rays, which cause said stimulable phosphor sheet to emit light in proportion to the amount of energy stored thereon during its exposure to the radiation, and photoelectrically detecting the emitted light.

45. A superposition processing apparatus for radiation images as defined in claim 44 wherein said stimulating rays are a laser beam.

46. A superposition processing apparatus for radiation images as defined in claim 42 wherein the radiation images have been recorded on sheets of photographic film.

47. A superposition processing method for radiation images, comprising the steps of:
   i) irradiating two kinds of radiation images of a single object, each present on a medium, with image detection signals and detecting, based on said image detection signals, first and second image signals, each of which comprising a series of image signal components and which represent corresponding picture elements in said radiation images;
   ii) generating an unsharp signal of the first image signal S1 and an unsharp signal of the second image signal S2;
   iii) calculating a sensitivity Sk1 of each of the image signal components of the first image signal and a sensitivity Sk2 of each of the image signal components of the second image signal on the basis of said unsharp signal of the first image signal S1 and said unsharp signal of the second image signal S2; and iv) adding the image signal components of the first image signal and the second image signal in accordance with the following equation to obtain an addition signal S:

$$S=(Sk2/(Sk1+Sk2))\times S1+(Sk1/(Sk1+Sk2))\times S2.$$

48. A superposition processing method for radiation images as defined in claim 47 wherein the radiation images have been stored on stimulable phosphor sheets.

49. A superposition processing method for radiation images as defined in claim 47 wherein each of the first and second image signals is obtained by exposing each of said stimulable phosphor sheets to stimulating rays, which cause said stimulable phosphor sheet to emit light in proportion to the amount of energy stored thereon during its exposure to the radiation, and photoelectrically detecting the emitted light.

50. A superposition processing method for radiation images as defined in claim 49 wherein said stimulating rays are a laser beam.

51. A superposition processing method for radiation images as defined in claim 47 wherein the radiation images have been recorded on sheets of photographic film.

52. A superposition processing apparatus for radiation images comprising:

means for irradiating two kinds of radiation images of a single object, each present on a medium, with signals image detection and detecting, based on said image detection signals, first and second image signals, each of which comprising a series of image signal components and which represent corresponding picture elements in said radiation images; and means for generating an addition signal based on the image signal components of the first and second image signals, comprising:

i) an operation device for generating an unsharp signal of the first image signal S1 and an unsharp signal of the second image signal S2, and calculating a sensitivity Sk1 of each of the image signal components of the first image signal and a sensitivity Sk2 of each of the image signal components of the second image signal on the basis of said unsharp signal of the first image signal S1 and said unsharp signal of the second image signal S2; and ii) an addition device for adding the image signal components of the first image signal and the second image signal in accordance with the following equation to obtain an addition signal S:

$$S=(Sk2/(Sk1+Sk2))\times S1+(Sk1/(Sk1+Sk2))\times S2.$$

53. A superposition processing apparatus for radiation images as defined in claim 52 wherein the radiation images have been stored on stimulable phosphor sheets.

54. A superposition processing apparatus for radiation images as defined in claim 53 wherein each of the first and second image signals is obtained by exposing each of said stimulable phosphor sheets to stimulating rays, which cause said stimulable phosphor sheet to emit light in proportion to the amount of energy stored thereon during its exposure to the radiation, and photoelectrically detecting the emitted light.

55. A superposition processing apparatus for radiation images as defined in claim 54 wherein said stimulating rays are a laser beam.

56. A superposition processing apparatus for radiation images as defined in claim 52 wherein the radiation images have been recorded on sheets of photographic film.

* * * * *